United States Patent
Sugaya

(10) Patent No.: US 11,012,854 B2
(45) Date of Patent: May 18, 2021

(54) COMMUNICATION DEVICE AND COMMUNICATION METHOD

(71) Applicant: SONY CORPORATION, Tokyo (JP)

(72) Inventor: Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/751,934

(22) PCT Filed: Aug. 2, 2016

(86) PCT No.: PCT/JP2016/072690
§ 371 (c)(1),
(2) Date: Feb. 12, 2018

(87) PCT Pub. No.: WO2017/064902
PCT Pub. Date: Apr. 20, 2017

(65) Prior Publication Data
US 2018/0242145 A1    Aug. 23, 2018

(30) Foreign Application Priority Data
Oct. 16, 2015 (JP) .............................. JP2015-204734

(51) Int. Cl.
*H04W 8/26* (2009.01)
*H04W 76/11* (2018.01)
(Continued)

(52) U.S. Cl.
CPC ............. *H04W 8/26* (2013.01); *H04W 28/06* (2013.01); *H04W 52/02* (2013.01); *H04W 76/11* (2018.02);
(Continued)

(58) Field of Classification Search
None
See application file for complete search history.

(56) References Cited

U.S. PATENT DOCUMENTS 9,936,537 B2 * 4/2018 Kwon ............... H04W 74/0816
9,942,193 B1 * 4/2018 Chu ....................... H04W 84/12
(Continued)

FOREIGN PATENT DOCUMENTS

| CN | 104335511 A | 2/2015 |
| EP | 2642803 A1 | 9/2013 |

(Continued)

OTHER PUBLICATIONS

International Search Report dated Oct. 18, 2016, in PCT/JP2016/072690, filed Aug. 2, 2016.
(Continued)

*Primary Examiner* — Faruk Hamza
*Assistant Examiner* — Cassandra L Decker
(74) *Attorney, Agent, or Firm* — Xsensus LLP

(57) ABSTRACT

[Object] To provide a mechanism capable of suppressing confusion in communication using a local identifier.
[Solution] A communication device includes a communication unit configured to receive a first signal addressed to another communication device including first information in which a local identifier which is used in a wireless local area network (LAN) and different from a global identifier is specified and transmit a second signal including second information in which the local identifier specified from the first information included in the received first signal is specified. A communication device includes a communication unit configured to receive a second signal including second information in which a local identifier which is used in a wireless local area network (LAN) and different from a global identifier is specified and transmit a third signal including third information in which the local identifier allocated by the communication device is specified.

11 Claims, 19 Drawing Sheets

| | | PHY Identifier Information Element | | | |
|---|---|---|---|---|---|
| Element ID | Length | Frequency Ch. 1 | Frequency Ch. 2 | ••• | Frequency Ch. N |
| | | PID Bitmap | PID Bitmap | ••• | PID Bitmap |

(51) Int. Cl.
*H04W 52/02* (2009.01)
*H04W 28/06* (2009.01)
*H04W 84/12* (2009.01)
*H04W 24/02* (2009.01)

(52) U.S. Cl.
CPC ............ *H04W 84/12* (2013.01); *H04W 24/02* (2013.01); *Y02D 30/70* (2020.08)

(56) References Cited

U.S. PATENT DOCUMENTS

| | | | |
|---|---|---|---|
| 10,383,053 B2* | 8/2019 | Asterjadhi | H04W 52/0219 |
| 10,404,653 B1* | 9/2019 | Chu | H04L 61/2038 |
| 10,524,290 B1* | 12/2019 | Chu | H04L 27/0006 |
| 2011/0190027 A1* | 8/2011 | Michel | H04W 24/02 |
| | | | 455/522 |
| 2012/0287850 A1* | 11/2012 | Wentink | H04W 52/0206 |
| | | | 370/328 |
| 2013/0128809 A1* | 5/2013 | Wentink | H04L 29/0604 |
| | | | 370/328 |
| 2014/0003315 A1 | 1/2014 | Liu | |
| 2014/0198723 A1* | 7/2014 | Gong | H04W 74/006 |
| | | | 370/328 |
| 2015/0131640 A1 | 5/2015 | Seok et al. | |
| 2015/0146524 A1* | 5/2015 | Jeong | H04W 28/0215 |
| | | | 370/230 |
| 2015/0163666 A1 | 6/2015 | Jeong et al. | |
| 2015/0245292 A1 | 8/2015 | Jeong et al. | |
| 2016/0227572 A1 | 8/2016 | Li et al. | |
| 2016/0330685 A1* | 11/2016 | Asterjadhi | H04L 12/1886 |
| 2016/0345258 A1* | 11/2016 | Zhou | H04W 48/16 |
| 2017/0006606 A1* | 1/2017 | Matsuo | H04W 72/0446 |
| 2017/0171861 A1* | 6/2017 | Seok | H04W 74/0816 |

FOREIGN PATENT DOCUMENTS

| | | |
|---|---|---|
| JP | 2014-501082 A | 1/2014 |
| JP | 2015-515238 A | 5/2015 |
| JP | 5746425 B2 | 7/2015 |
| JP | 2015-526010 A | 9/2015 |
| WO | 2014/005054 A2 | 1/2014 |
| WO | 2015/077223 A1 | 5/2015 |

OTHER PUBLICATIONS

Office Action dated Jul. 14, 2020, in corresponding Japanese patent Application No. 2017-545105, 20 pages.
Chinese Office Action dated Sep. 28, 2020, in corresponding Chinese Patent Application No. 201680058825.6.

* cited by examiner

FIG. 9

| Association Identifier Element | | | | |
|---|---|---|---|---|
| Element ID | Length | Frequency Channels | Start AID | AID Bitmap |

FIG. 10

| PHY Identifier Information Element | | | | | |
|---|---|---|---|---|---|
| Element ID | Length | Frequency Ch. 1 | Frequency Ch. 2 | ... | Frequency Ch. N |
| | | PID Bitmap | PID Bitmap | ... | PID Bitmap |

COMMUNICATION DEVICE AND COMMUNICATION METHOD

TECHNICAL FIELD

The present disclosure relates to communication devices and communication methods.

BACKGROUND ART

In recent years, wireless local area networks (LANs) representative of Institute of Electrical and Electronics Engineers (IEEE) 802.11 have been widely used. Further, along with this, wireless LAN compatible products (hereinafter also referred to simply as "communication devices") have also increased. As the number of such communication devices increases, a possibility of a decrease in communication efficiency increases. For this reason, technology development for improving the communication efficiency has been performed.

For example, an invention related to a method of improving communication efficiency by reducing header information of a frame (a packet) is disclosed in Patent Literature 1. Specifically, instead of a global identifier such as a media access control (MAC) address, a local identifier such as an association identifier (AID) is stored in a frame as part of the header information. Since the AID is data shorter than the MAC address, the size of the header information is reduced, and thus the communication efficiency is expected to be improved.

Further, the local identifier such as the AID is allocated by a communication device operating as an access point (AP) (hereinafter also referred to simply as an AP). Specifically, the local identifier is independently allocated for each wireless communication network such as, for example, a basic service set (BSS) including an AP and a communication device operating as a station (STA) connected to the AP (hereinafter also referred to simply as an STA).

CITATION LIST

Patent Literature

Patent Literature 1: JP 5746425B

DISCLOSURE OF INVENTION

Technical Problem

However, in the invention disclosed in Patent Literature 1, confusion may occur in communication using the local identifier. For example, since the local identifier is independently allocated for each BSS as described above, there are cases in which the local identifiers overlap between BSSs. In this case, in an environment in which BSSs overlap (hereinafter also referred to as an overlapping BSS (OBSS) environment), a BSS associated with communication using the local identifier is unclear. As a result, confusion of communication such as overlapping of communication or the occurrence of wrong communication may occur.

In this regard, the present disclosure proposes a mechanism capable of suppressing confusion in communication using the local identifier.

Solution to Problem

According to the present disclosure, there is provided a communication device including a communication unit configured to receive a first signal addressed to another communication device including first information in which a local identifier which is used in a wireless local area network (LAN) and different from a global identifier is specified, and configured to transmit a second signal including second information in which the local identifier specified from the first information included in the received first signal is specified.

In addition, according to the present disclosure, there is provided a communication device including a communication runt configured to receive a second signal including second information in which a local identifier which is used in a wireless local area network (LAN) and different from a global identifier is specified, and configured to transmit a third signal including third information in which a local identifier allocated by the own communication device is specified.

In addition, according to the present disclosure, there is provided a communication method including: receiving, by a communication unit, a first signal addressed to another communication device including first information in which a local identifier which is used in a wireless local area network (LAN) and different from a global identifier is specified; and transmitting, by the communication unit, a second signal including second information in which the local identifier specified from the first information included in the received first signal is specified.

In addition, according to the present disclosure, there is provided a communication method including: receiving, by a communication unit, a second signal including second information in which a local identifier which is used in a wireless local area network (LAN) and different from a global identifier is specified; and transmitting, by the communication unit, a third signal including third information in which a local identifier allocated by the own communication device is specified.

Advantageous Effects of Invention

As described above, according to the present disclosure, a mechanism capable of suppressing contusion in communication using a local identifier is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is a diagram illustrating a configuration example of local information according to one embodiment of the present disclosure.

FIG. 10 is a diagram illustrating a configuration example of local information according to the embodiment.

MODE(S) FOR CARRYING OUT THE INVENTION

Figure 1:
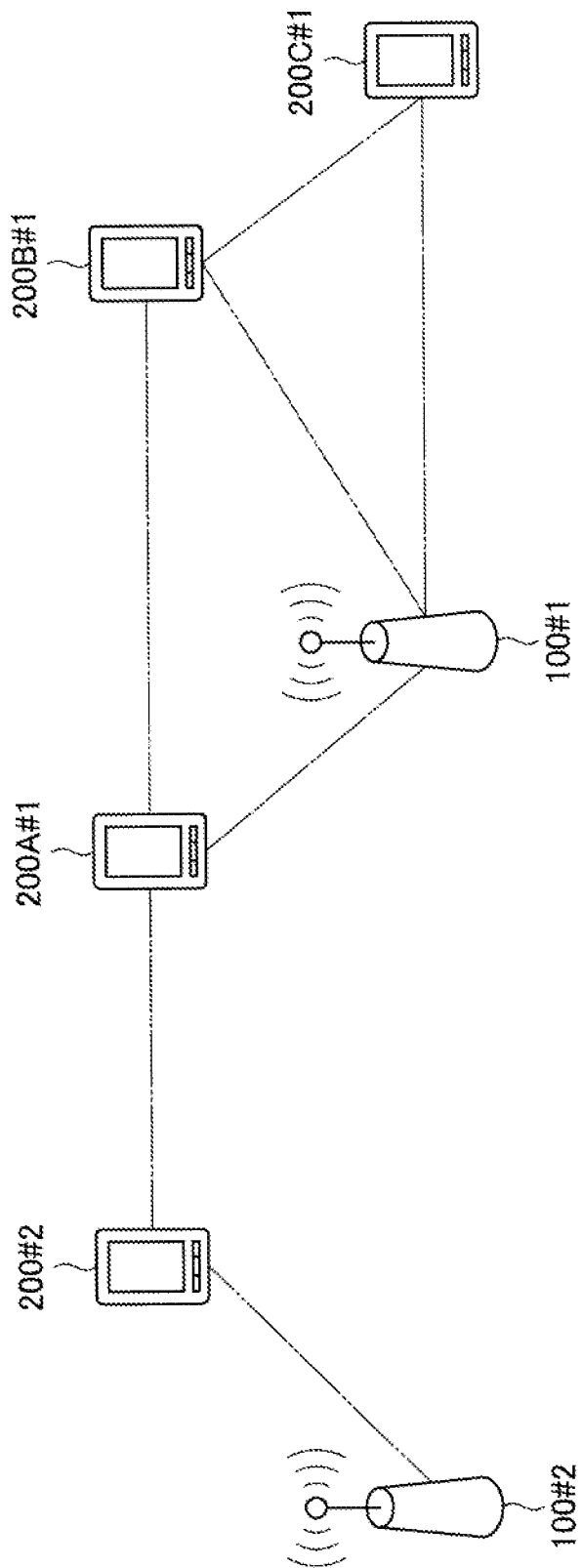
FIG. 1 is a diagram illustrating a configuration example of a communication system including a communication device according to one embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Further, in this specification and the drawings, there are cases in which a plurality of structural elements having substantially the same function are distinguished by adding different numbers to the end of the same reference numeral. For example, a plurality of structural elements having substantially the same function are distinguished as necessary like an STA 200A and an STA 200B. However, in a case where it is unnecessary to distinguish structural elements having substantially the same function, only the same reference numeral is added. For example, in a case where it is unnecessary to particularly distinguish the STA 200A and the STA 200B, they are simply referred to as "STAs 200."

Further, the description will proceed in the following order.
1. Overview of communication device according to one embodiment of present disclosure and problems of related art
2. Details of communication device according to one embodiment of present disclosure
2-1. Configuration of communication device
2-2. Details of functions of communication device
2-3. Processes of communication devices
2-4. Conclusion of present embodiment
3. Application examples
4. Conclusion

1. Overview of Communication Device According to One Embodiment of Present Disclosure and Problems of Related Art First, an overview of a communication device according to one embodiment of the present disclosure will be described with reference to FIG. 1. FIG. 1 is a diagram illustrating a configuration example of a communication system including a communication device according to one embodiment of the present disclosure.

The communication device according to one embodiment of the present disclosure has a communication connection function and a signal transmission/reception function. Specifically, the communication device is an AP 100 or an STA 200, and the STA 200 transmits a communication connection request to the AP 100. Upon receiving the communication connection request, in a case in which the AP 100 permits establishment of a communication connection, the AP 100 allocates a local identifier in a wireless communication network to which the AP 100 belongs, and transmits a communication connection response including the local identifier to the STA 200. Further, if the communication connection is established, the AP 100 and the STA 200 communicate with each other using the allocated local identifiers.

For example, a case in which an AP 100 #1 and STAs 200A #1 to 200C #1 belong to a BSS #1, and an AP 100 #2 and an STA 200 #2 belong to a BSS #2 as illustrated in FIG. 1 is considered.

The STA 200A #1 is located to be able to communicate with the AP 100 #1 and transmits an association request frame to the AP 100 #in a case in which the STA 200A #1 establishes a communication connection with the AP 100 #1. Upon receiving the association request frame, the AP 100 #1 allocates an AID to the STA 200A #1, and transmits an association response frame including the allocated AID to the STA 200A #1 in a case in which the AP 100 #1 permits the communication connection. Thereafter, the AP 100 #1 and the STA 200A #1 communicate with each other using the allocated AID. Similarly, in a case in which the STA 200 #2 establishes a communication connection with the AP 100 #2, the association request frame and the association response frame are communicated.

Figure 2A:
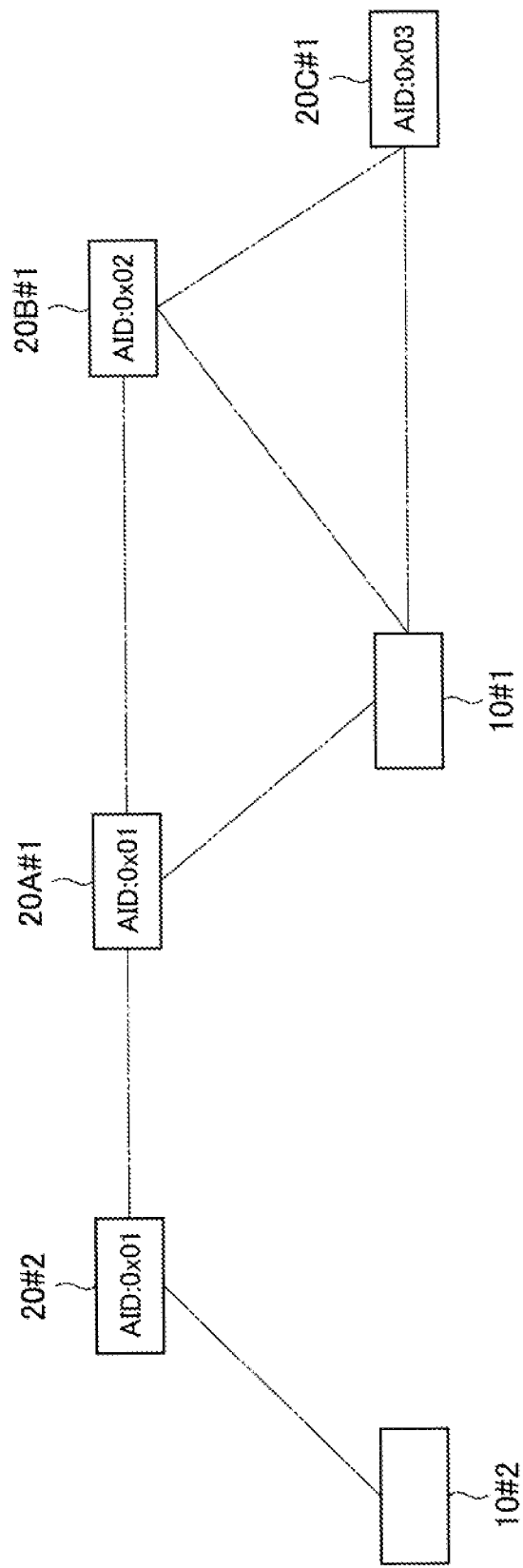
FIG. 2A is a diagram for describing an example of an overlap allocation of an AID according to a related art.
Figure 2B:
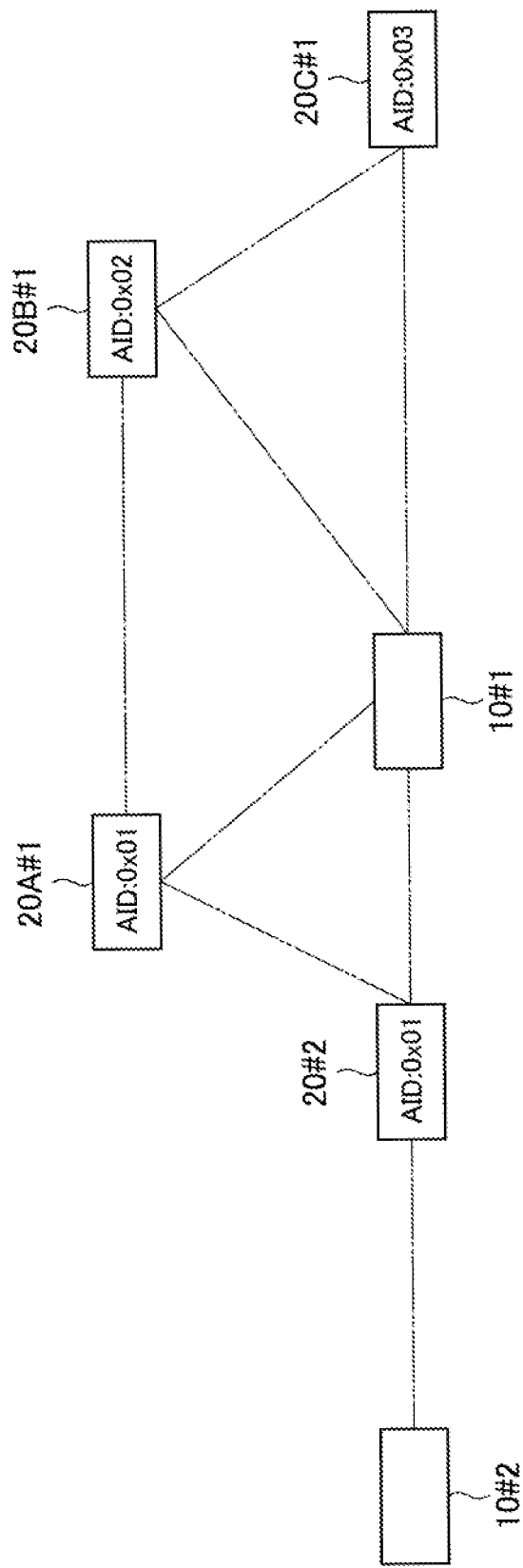
FIG. 2B is a diagram for describing an example of an overlap allocation of an AID according to a related art.

Here, in the related art, the local identifier is independently allocated for each wireless communication network. For this reason, in a case in which ranges of wireless communication networks overlap, confusion may occur in communication using the local identifier. This case will be described in detail with reference to FIGS. 2A and 2B. FIGS. 2A and 2B are diagrams for describing an example of overlap allocation of an AID according to the related art.

In the related art, a local identifier such as an AID is independently allocated for each BSS. Therefore, the local identifiers are likely to overlap between the BSSs. For example, as illustrated in FIG. 2A, 0x01 to 0x03 are allocated to STAs 20A #1 to 20C #1 belonging to a BSS #1 as the AID. Further, 0x01 is allocated to the STA 20 #2 belonging to a BSS #2 as the AID. As described above, in the example of FIG. 2A, the AID of the STA 20A #1 and the AID of the STA 20 #2 overlap. As a result, as illustrated in FIG. 2A, in a case in which the STA 20A #1 and the STA 20 #2 are located to be able to communicate with each other a signal related to communication using the AID addressed to the AP 10 transmitted from one of the STA 20A #1 or the STA 20 #2 is likely to be received by the other, leading to confusion of communication.

Further, as illustrated in FIG. 2B, in a case in which the STA 20 #2 and the AP 10 #1 are located to be able to communicate with each other, the AP 10 #1 is likely to erroneously recognize a signal addressed to the AP 10 #2 transmitted from the STA 20 #2 as a signal addressed to the AP 10 #1 transmitted from the STA 20A #1 and transmit a sural addressed to the STA 20A #1. On the other hand, the STA 20 #2 is likely to erroneously recognize and receive the signal addressed to the STA 20A #1 from the AP 10 #1 as the signal addressed to the STA 20 #2.

Figure 3A:
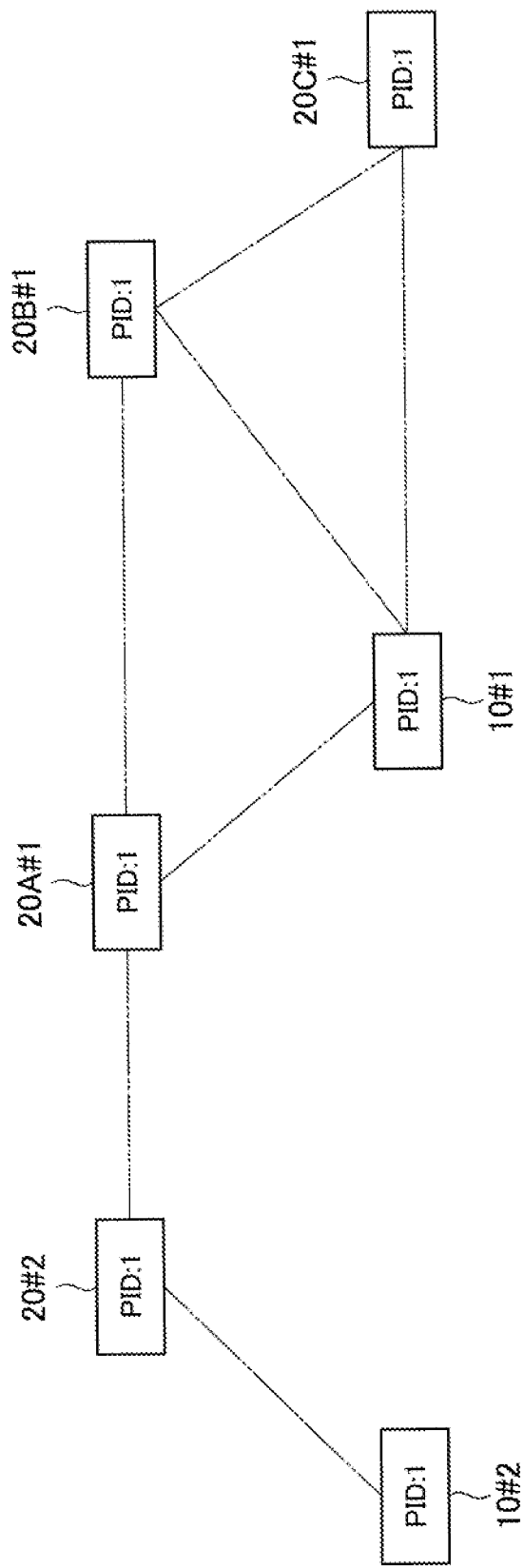
FIG. 3A is a diagram for describing an example of an overlap allocation of an AID according to a related art.
Figure 3B:
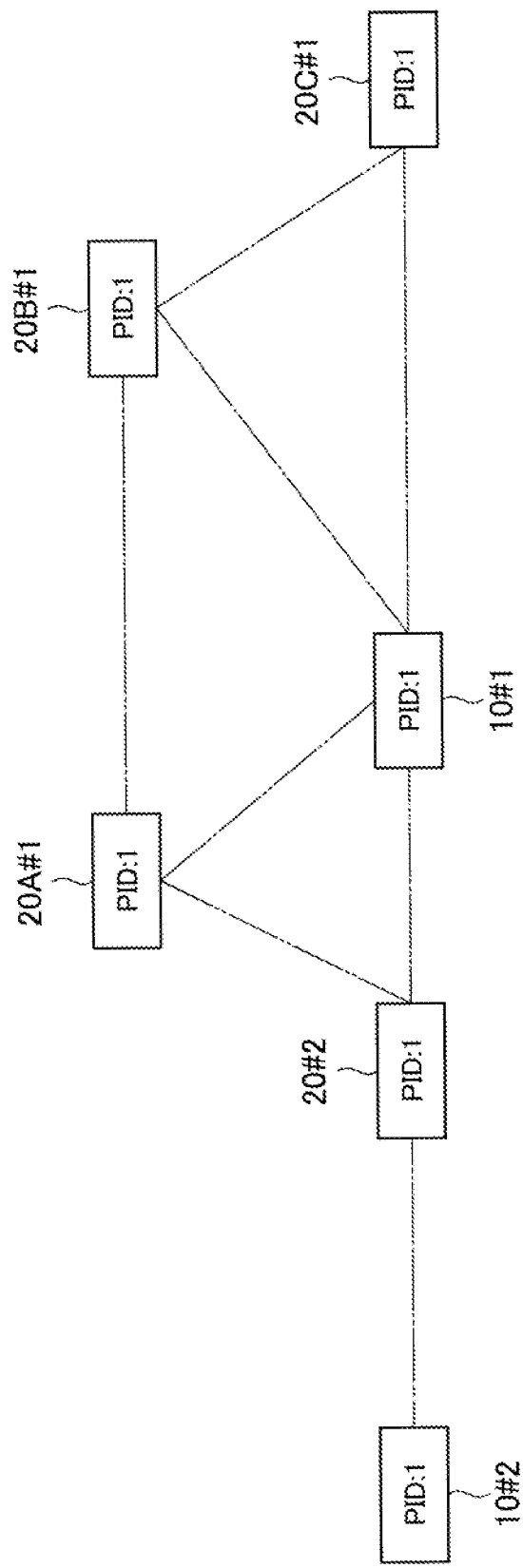
FIG. 3B is a diagram for describing an example of an overlap allocation of an AID according to a related art.

Further, the local identifier may be a physical layer (PHY) identifier (hereinafter also referred to as a "PHY ID" or a "PID"). For example, the PHY identifier is COLOR information of the BSS. Further, an example in which the local identifier is the PID will be described in detail with reference to FIGS. 3A and 3B. FIGS. 3A and 3B are diagrams for describing an example of an overlap allocation of a PID according to a related art.

Similarly to the case of the AID, the PHY identifier is independently allocated for each BSS as well. Therefore, the PHY identifiers are likely to overlap between BSSs. For example, as illustrated in FIG. 3A, in a BSS #1, 1 is allocated as the PID. Further, in a BSS #2, 1 is allocated as the PID. Further, the PID, for example, the COLOR information of the BSS, is allocated by the AP 10. As described above, in the example of FIG. 3A, the PIDs of the BSS #1 and the BSS #2 overlap. As a result, in a case in which the STA 20A #1 and the STA 20 #2 are located to be able to communicate with each other as illustrated in FIG. 3A, the sutural addressed to the AP 10 transmitted from one of the STA 20A #1 and the STA 20 #2 is likely to be received by the other because the signal addressed to the AP 10 has the same PID. Further, a transmission stop period, for example, a network allocation vector (NAV) period, may be set on the basis of reception of the signal having the same PID.

Further, the PID is included in a physical layer convergence protocol (PLCP) header (also referred to as a "PHY header"), but since it is preferable that the PLCP header be short, it is preferable that the data size of the PID be small as well. For example, the COLOR information includes seven types of information indicated using three bits. Therefore, in a case in which the APs 10 are densely arranged, the PID is highly likely to overlap other PIDs.

Further, in a case in which the STA 20 #2 and the AP 10 #1 are located to be able to communicate with each other as illustrated in FIG. 3B, the AP 10 #1 is likely to erroneously recognize a signal for the BSS #2 transmitted from the STA 20 #2 as a signal for the BSS #1 to which the AP 10 #1 belongs and perform a communication process. Conversely, the STA 20 #2 is likely to erroneously recognize and receive the signal for the BSS #1 transmitted from the AP 10 #1 as the signal addressed to the STA 20 #2.

As described above, in the related arts, since the local identifiers overlap between the BSSs, confusion of communication such as overlap of communication or the occurrence of erroneous communication may occur. Further, a technique in which APs 10 are connected in a wired manner or the like, and local identifiers of individual BSSs are shared between the APs 10 via wired communication has also been developed. Of course, if this technique is used, the overlap of the local identifiers between BSSs can be prevented. However, in this technique, it is assumed that the APs 10 are connected, and additional cost is incurred.

Figure 4A:
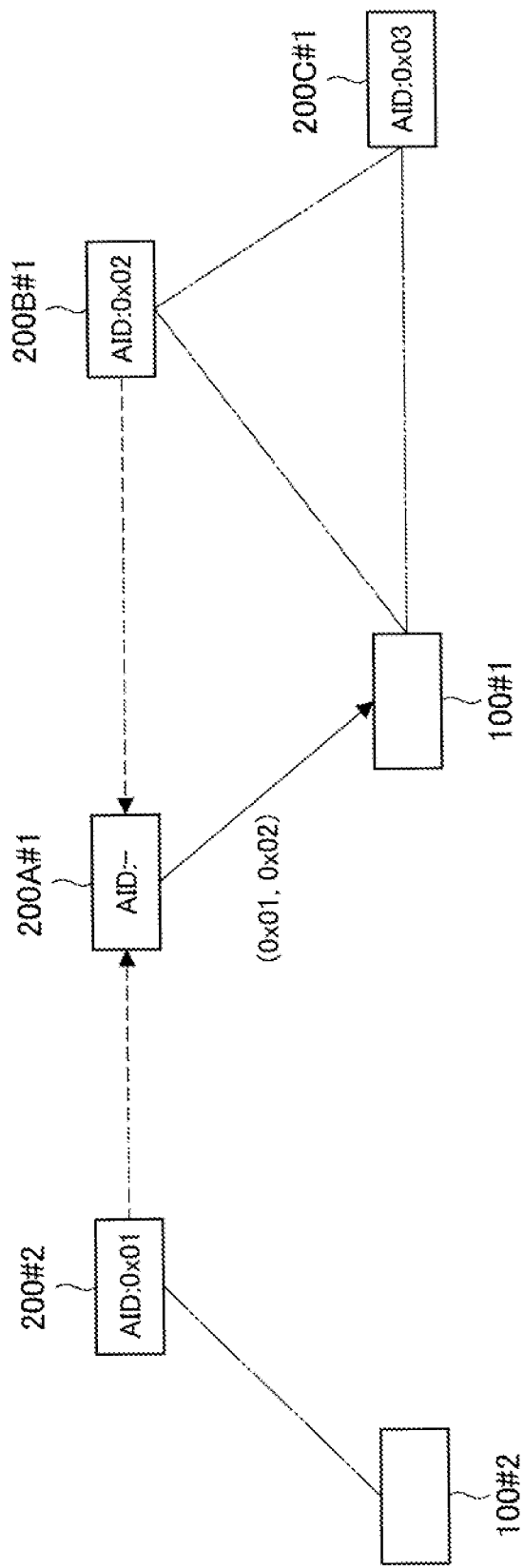
FIG. 4A is a diagram for describing an example of allocation of an AID in one embodiment of the present disclosure.
Figure 4B:
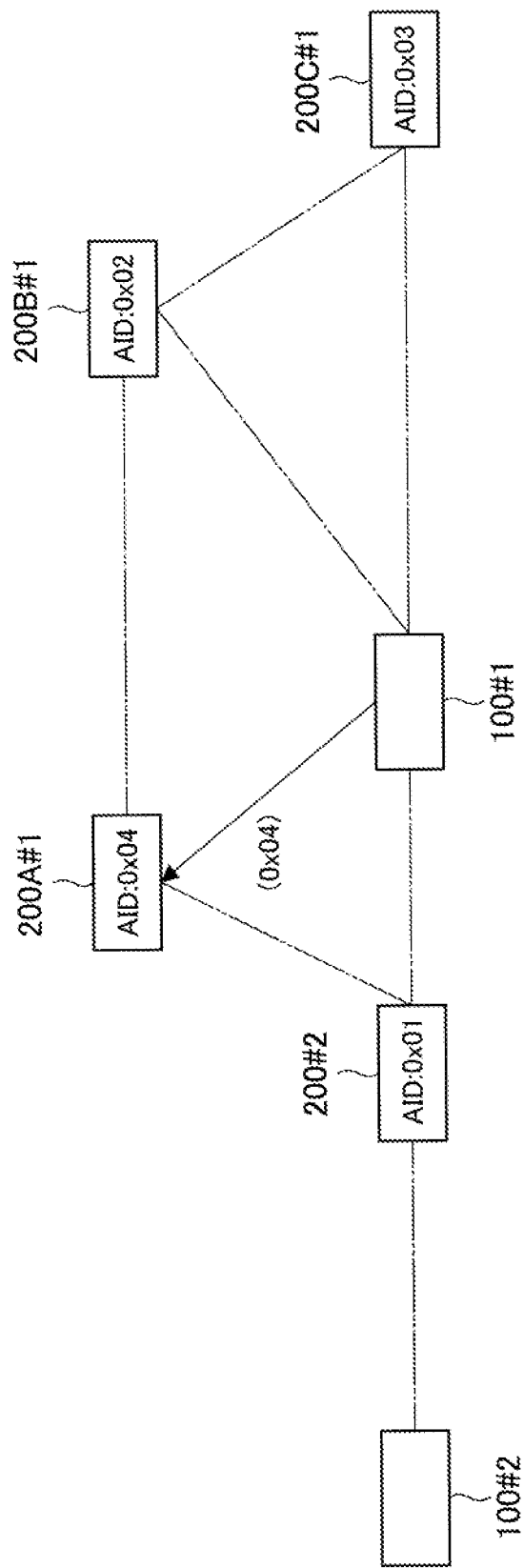
FIG. 4B is a diagram for describing an example of allocation of an AID in one embodiment of the present disclosure.
Figure 5A:
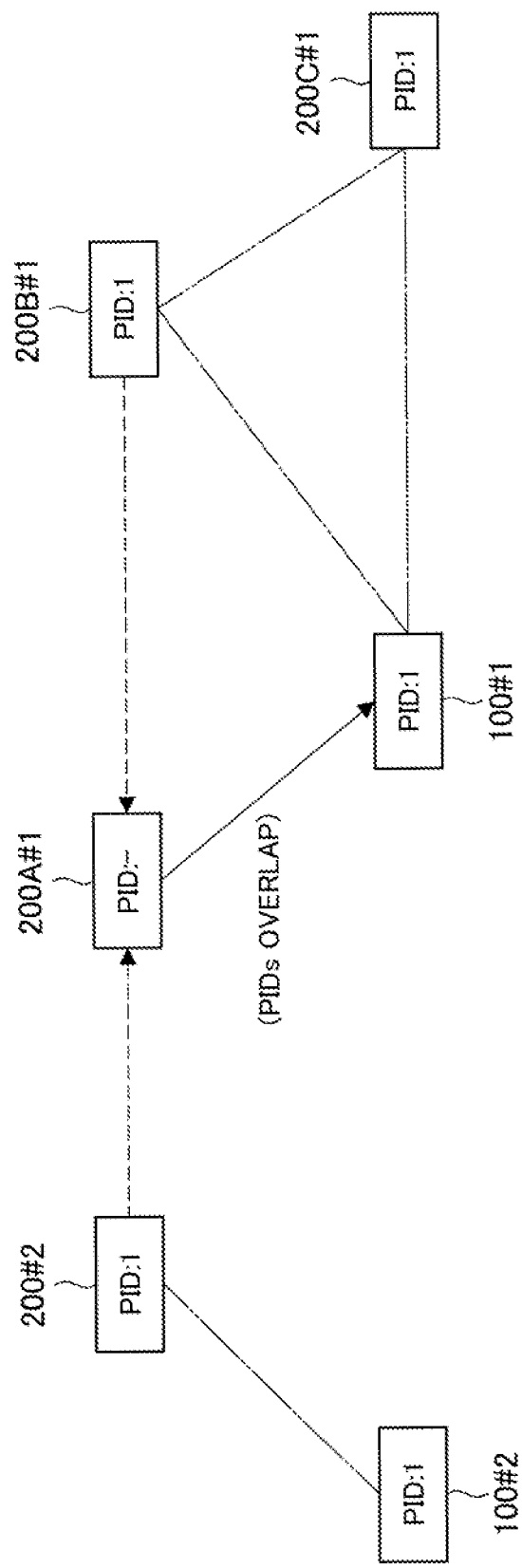
FIG. 5A is a diagram fore describing an example of allocation of a PID in one embodiment of the present disclosure.
Figure 5B:
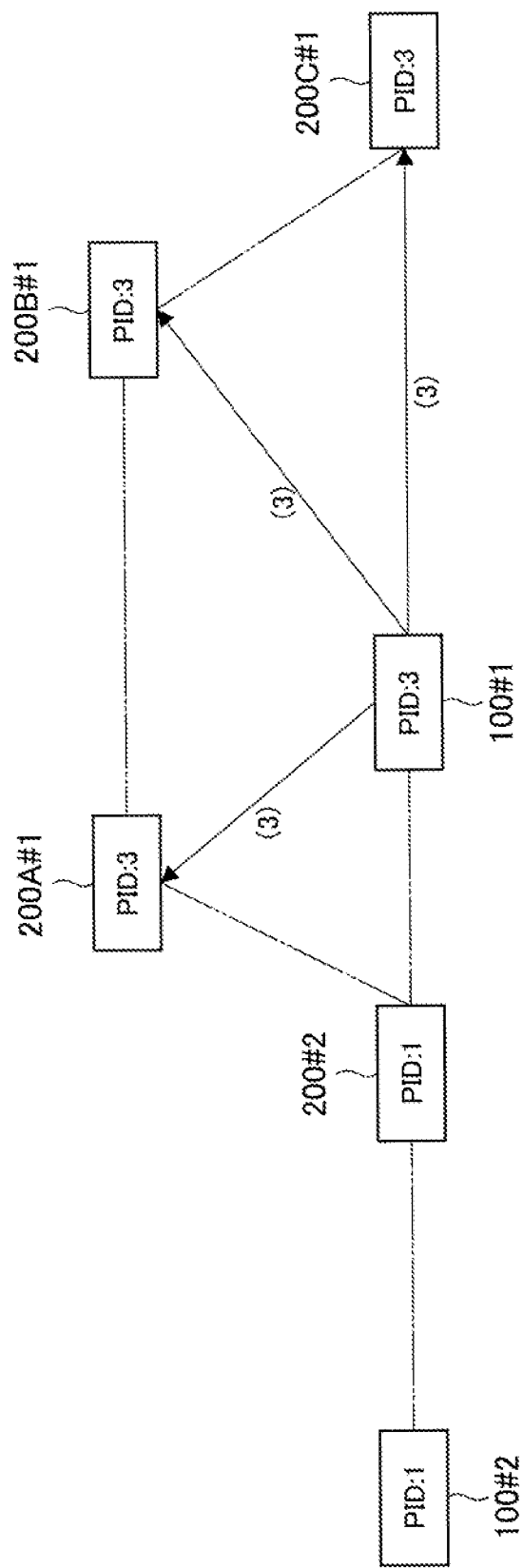
FIG. 5B is a diagram for describing an example of allocation of a PID in one embodiment of the present disclosure.

In this regard, in the present disclosure, a communication device that receives a first signal addressed to another communication device including first information in which a local identifier is specified and transmits a second signal including second information in which a local identifier specified from the first information included in the first signal is specified is proposed as the STA 200. Further, a communication device that receives the second signal and communicates a third signal including third information in which a local identifier allocated by the communication device is specified is proposed as the AP 100. An overview of a process will be described with reference to FIGS. 4A and 4B and FIGS. 5A and 5B. FIGS. 4A and 4B are diagrams for describing an example of allocation of an AID in one embodiment of the present disclosure. Further, FIGS. 5A and 5B are diagrams for describing an example of allocation of a PID in one embodiment of the present disclosure.

First, a case in which the local identifier is the AID will be described with reference to FIGS. 4A and 4B. An STA 200A #1 receives a signal including an AID (0x01) from an STA 200 #2 and a signal including an AID (0x02) from an STA 200B #1 as illustrated in FIG. 4A. Then, the STA 200A #1 transmits a signal including information in which the AIDs (0x01 and 0x02) obtained from the received signals are specified to the AP 100 #1.

The AP 100 #1 receives the signal including the information in which the AIDs (0x01 and 0x02) are specified from the STA 200A #1. Then, the AP 100 #1 allocates an AID (0x04) for the STA 200A #1 on the basis of the information in which the AIDs (0x01 and 0x02) obtained from the received signals are specified. Then, the AP 100 #1 transmits a signal including the allocated AID (0x04) to the STA 200A #1 as illustrated in FIG. 4B.

Next, a case in which the local identifier is the PID will be described with reference to FIG. 5A and FIG. 5B. The STA 200A #1 receives a signal including a PID (1) from the STA 200 #2 and a signal including a PID (1) from the STA 200B #1 as illustrated in FIG. 5A. Then, in a case in which the PIDs (1) obtained from the received signals overlap, the STA 200A #1 transmits a signal including information indicating the overlap of the PIDs to the AP 100 #1 as information in which the overlapping PIDs (1) are specified.

The AP 100 #1 receives a signal including information indicating the overlap of the PIDs from the STA 200A #1. Then, the AP 100 #1 changes the PID (1) specified on the basis of the received signal to another PID (3). Then, the AP 100 #1 transmits a signal including the changed PID (3) to the STA 200A #1 to STA 200C #1 as illustrated in FIG. 5B.

As described above, the STA 200 receives a first signal addressed to another communication device including first information in which a local identifier is specified and transmits a second signal including second information in which a local identifier specified from the first information included in the first signal is specified. Further, the AP 100 receives the second signal and communicates a third signal including third information in which a local identifier allocated by the AP 100 is specified. Therefore, the overlap of the local identifiers can be prevented by notifying the AP 100 of information of already allocated local identifiers. Therefore, it is possible to suppress confusion in communication using the local identifier even in the OBSS environment.

Further, in FIG. 1, the BSS including the AP 100 and the STA 200 has been described as an example of a wireless communication network, but all communication devices may be STAs 200, and one of the STAs 200 may have a plurality of direct links with the other STAs 200. In this case, the downlink from the AP 100 to the STA 200 is interpreted as "simultaneous transmission from one STA 200 to a plurality of STAs 200," and the uplink from the STA 200 to the AP 100 is interpreted as "simultaneous transmission from a plurality of STAs 200 to one STA 200."

2. Details of Communication Device According to One Embodiment of Present Disclosure The overview of the communication device according to one embodiment of the present disclosure has been described above. Next, details of the communication device according to one embodiment of the present disclosure will be described.

2-1. Configuration of Communication Device

Figure 6:
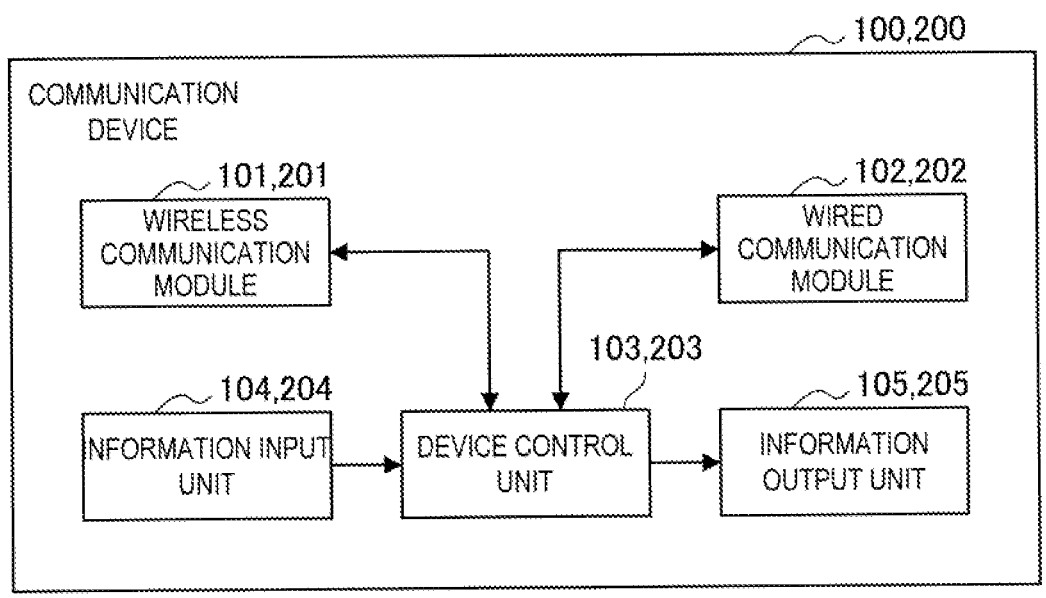
FIG. 6 is a block diagram illustrating an example of a schematic functional configuration of a communication device according to one embodiment of the present disclosure.

First, functional configurations of the AP 100 and the STA 200 (hereinafter also referred to as a communication device 100 (200)) according to one embodiment of the present disclosure will be described with reference to FIG. 6. FIG. 6 is a block diagram illustrating an example of a schematic functional configuration of a communication device 100 (200) according to one embodiment of the present disclosure.

As illustrated in FIG. 6, a communication device 100 (200) includes a wireless communication module 101 (201), a wired communication module 102 (202), a device control unit 103 (203), an information input unit 104 (204), and an information output unit 105 (205).

The wireless communication module 101 (201) performs wireless communication with the AP 100 or the STA 200. Specifically, the wireless communication module 101 (201) transmits data obtained from the device control unit 103 (203) and provides received data to the device control unit 103 (203). The details will be described later.

The wired communication module 102 (202) communicates with an external device via wired communication. Specifically, the wired communication module 102 (202) is connected to the Internet and communicates with the external device via the Internet. For example, the wired communication module 102 (202) transmits data acquired via communication by the wireless communication module 101 (201) to the external device via the Internet. Further, the wired communication module 207 may not be included in the STA 200.

The device control unit 103 (203) controls operation of the communication device 100 (200) in general. Specifically, the device control unit 103 (203) controls communication of the wireless communication module 101 (201) and the wired communication module 102 (202). For example, the device control unit 103 (203) causes the wireless communication module 101 (201) or the wired communication module 102 (202) to transmit data obtained from the information input unit 104 (204). Further, the device control unit 103 (203) causes the information output unit 105 (205) to output data obtained by the communication of the wireless communication module 101 (201) or the wired communication module 102 (202).

The information input unit 104 (204) receives an input from the outside of the communication device. Specifically, the information input unit 104 (204) receives a user input or information obtained from a sensor. For example, the information input unit 104 (204) is an input device such as a keyboard or a touch panel or a detection device such as a sensor. Further, the information input unit 104 (204) may convert a signal obtained from the sensor into information which can be processed by the device control unit 103 (203). For example, the information input unit 104 (204) converts a signal obtained from an imaging sensor into image information. Further, the information input unit 104 may not be included in the AP 100.

The information output unit 105 (205) outputs data. Specifically, the information output unit 105 (205) outputs data instructed from the device control unit 103 (203). For example, the information output unit 105 (205) is a display that outputs images on the basis of image information, a speaker that outputs sounds or music on the basis of audio information, or the like. Further, the information output unit 105 may not be included in the AP 100.

Configuration of Wireless Communication Module

Figure 7:
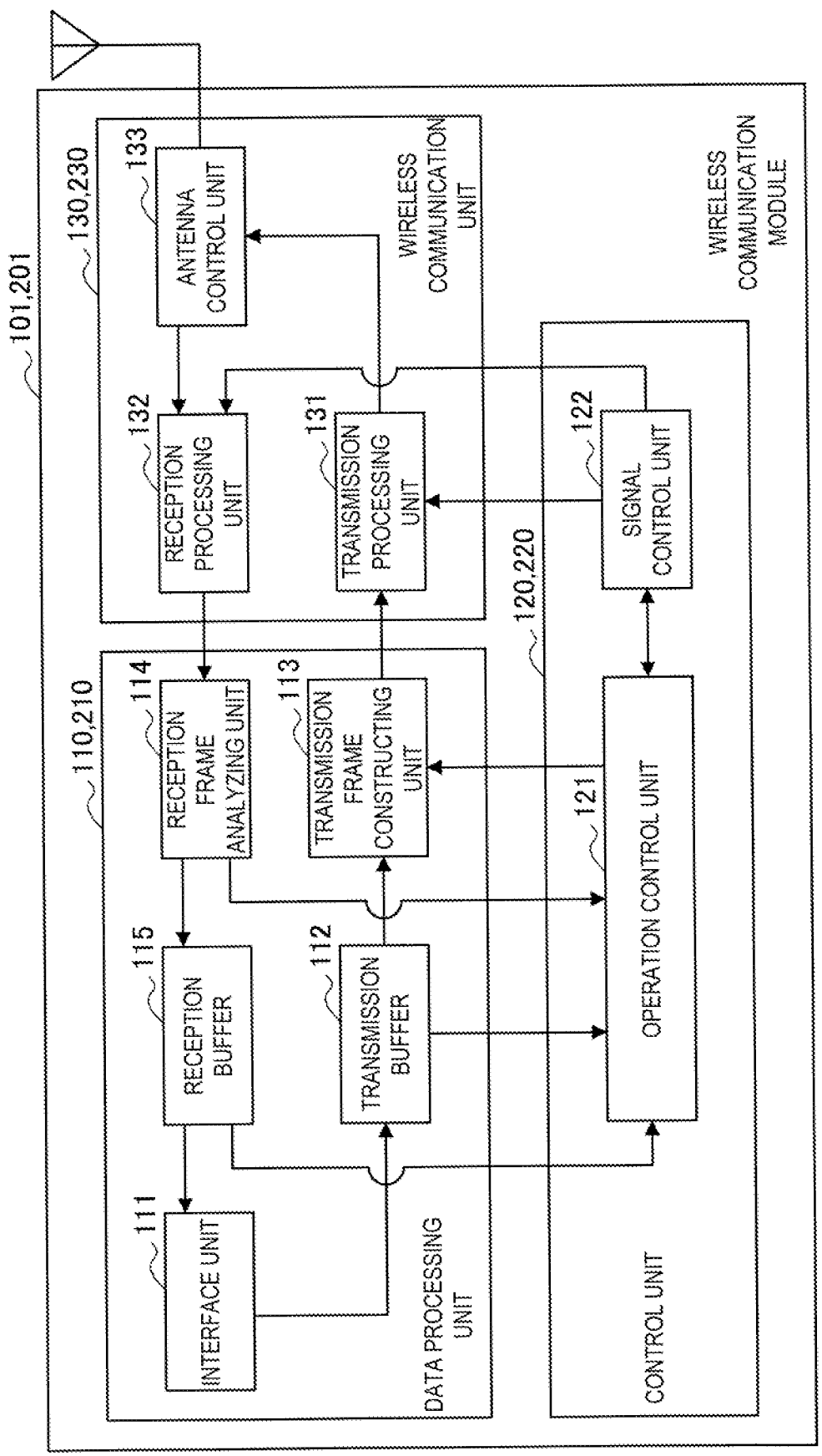
FIG. 7 is a block diagram illustrating an example of a schematic functional configuration of a wireless communication module according to the embodiment.

Next, a functional configuration of the wireless communication module 101 (201) will be described with reference to FIG. 7. FIG. 7 is a block diagram illustrating an example of a schematic functional configuration of the wireless communication module 101 (201) according to one embodiment of the present disclosure.

As illustrated in FIG. 7, the wireless communication module 101 (201) includes a data processing unit 110 (210), a control unit 120 (220), and a wireless communication unit 130 (230) as a communication unit.

Data Processing Unit

As illustrated in FIG. 7, the data processing unit 110 (210) includes an interface unit 111, a transmission buffer 112, a transmission frame constructing unit 113, a reception frame analyzing unit 114, and a reception buffer 115.

The interface unit 111 is an interface connected to other functional components installed in the communication device 100 (200). Specifically, the interface unit 111 performs reception of data that is desired to be transmitted from another functional component, for example, the device control unit 103 (203), provision of reception data to the device control unit 103 (203), and the like.

The transmission buffer 112 stores data to be transmitted. Specifically, the transmission buffer 112 stores data obtained by the interface unit 111.

The transmission frame constructing unit 113 generates a frame to be transmitted. Specifically, the transmission frame constructing unit 113 generates a frame on the basis of data stored in the transmission buffer 112 or control information set by the control unit 120 (220). For example, the transmission frame constructing unit 113 generates a frame (packet) from data acquired from the transmission buffer 112, and performs a process of adding a MAC header for medium access control (MAC) and an error detection code to the generated frame and the like.

The reception frame analyzing unit 114 analyzes a received frame. Specifically, the reception frame analyzing unit 114 determines a destination of a frame received by the wireless communication unit 130 (230) and acquires data or control information included in the frame. For example, the reception frame analyzing unit 114 acquires data and the like included in the received frame by performing analysis of the MAC header, detection and correction of a code error, a reordering process, and the like on the received frame.

The reception buffer 115 stores received data. Specifically, the reception buffer 115 stores data acquired by the reception frame analyzing unit 114.

Control Unit

As illustrated in FIG. 7, the control unit 120 (220) includes a processing control unit 121 and a signal control unit 122.

The processing control unit 121 controls an operation of the data processing unit 110 (210). Specifically, the processing control unit 121 controls the occurrence of communication. For example, if a communication connection request occurs, the processing control unit 121 causes the data process unit 110 to generate frames related to a connection process or an authentication processing such as an association process or an authentication process.

Further, the processing control unit 121 controls generation of frames on the basis of a storage state of data in the transmission buffer 112, an analysis result for a reception frame, or the like. For example, in a case in which data is stored in the transmission buffer 112, the processing control unit 121 instructs the transmission frame constructing unit 113 to generate a data frame in which the data is stored. Further, in a case in which reception of a frame is confirmed by the reception frame analyzing unit 114, the processing control unit 121 instructs the transmission frame constructing unit 113 to generate an acknowledgment frame which is a response to a received frame.

The signal control unit 122 controls an operation of the wireless communication unit 130 (230). Specifically, the signal control unit 122 controls a transmission/reception process of the wireless communication unit 130 (230). For example, the signal control unit 122 causes the wireless communication unit 130 (230) to set a parameter for transmission and reception on the basis of an instruction from the processing control unit 121.

Further, information of a wireless communication network to which its own communication device belongs and the local identifier and the global identifier in the wireless communication network are managed by the control unit 120 (220).

Wireless Communication Unit

As illustrated in FIG. 7, the wireless communication unit 130 (230) includes a transmission processing unit 131, a reception processing unit 132, and an antenna control unit 133.

The transmission processing unit 131 performs a frame transmission process. Specifically, the transmission processing unit 131 generates a signal to be transmitted on the basis of a frame provided from the transmission frame constructing unit 113. More specifically, the transmission processing unit 131 generates a signal related to a frame on the basis of a parameter set in accordance with an instruction from the signal control unit 122. For example, the transmission processing unit 131 generates a symbol stream by performing encoding, interleaving, and modulation on the frame provided from the data processing unit 110 (210) in accordance with a coding and modulation scheme instructed by the control unit 120 (220). Further, the transmission processing unit 131 converts the signal related to the symbol stream obtained by the process at the previous stage into an analog signal, and performs amplification, filtering, and frequency up-conversion on the resulting signal.

Further, the transmission processing unit 131 may perform a frame multiplexing process. Specifically, the transmission processing unit 131 performs a process related to frequency division multiplexing or space division multiplexing.

The reception processing unit 132 performs a frame reception process. Specifically, the reception processing unit 132 restores the frame on the basis of the signal provided from the antenna control unit 133. For example, the reception processing unit 132 acquires a symbol stream by performing a process opposite to the signal transmission, for example, frequency down-conversion, digital signal conversion, and the like on a signal obtained from an antenna. Further, the reception processing unit 132 acquires a frame by performing demodulation, decoding, and the like on the symbol stream obtained by the process at the previous stage and provides the acquired frame to the data processing unit 110 (210) or the control unit 120 (220).

Further, the reception processing unit 132 may perform a process related to separation of a multiplexed frame. Specifically, the reception processing unit 132 performs a process related to separation of a frame multiplexed by the frequency division multiplexing or the space division multiplexing.

Further, the reception processing unit 132 may estimate a channel gain. Specifically, the reception processing unit 132 calculates complex channel gain information from a preamble portion or a training signal portion of the signal obtained from the antenna control unit 133. Further, the calculated complex channel gain information is used for a frame multiplexing-related process, a frame separation process, and the like.

The antenna control unit 133 performs transmission and reception of signals via at least one antenna. Specifically, the antenna control unit 133 transmits the signal generated by the transmission processing unit 131 via the antenna and provides the signal received via the antenna to the reception processing unit 132. Further, the antenna control unit 133 may perform control related to space division multiplexing.

2-2. Details of Functions of Communication Device

Next, the details of functions of the communication device 100 (200) according to one embodiment of the present disclosure will be described.

A. Details of Functions of STA

First, the details of the functions of the STA 200 will be described.

A-1. Collection of Allocated Local Identifiers

The STA 200 collects local identifiers which are already allocated. Specifically, the STA 200 receives a first signal addressed to another communication device including first information in which the local identifier is specified. The local identifier is an identifier allocated to the communication device belonging to the BSS. For example, the identifier allocated to the communication device is an AID. Specifically, the control unit 220 causes the wireless communication unit 230 to be on standby in a state in which the first signal can be received for a predetermined period. Then, in a case in which the signal is received by the wireless communication unit 230, the data processing unit 210 acquires the AID from the received signal. Further, reception standby and reception process of the signal are referred to collectively as "scanning." Further, the scanning may be executed at predetermined time intervals.

Further, the local identifier may be an identifier allocated to the wireless communication network instead of or in addition to the identifier allocated to the communication device. Specifically, the identifier allocated to the wireless communication network is an identifier (PHY identifier) of the physical layer and serves as information identifying the BSS in the physical layer. For example, if the signal is received, the wireless communication unit 230 acquires the COLOR information of the BSS included in the PLCP header of the signal.

The acquired local identifier is recorded in the STA 200. Specifically, the acquired local identifier is stored in a storage unit in an association with the wireless communication network or the BSS to which the local identifier is allocated. For example, the PID is stored in an association with a BSSID included in the signal including the PID. Further, the AID is stored in an association with the BSSID to which the AID is allocated. The AID may be stored without being associated with the BSSID.

Figure 8:
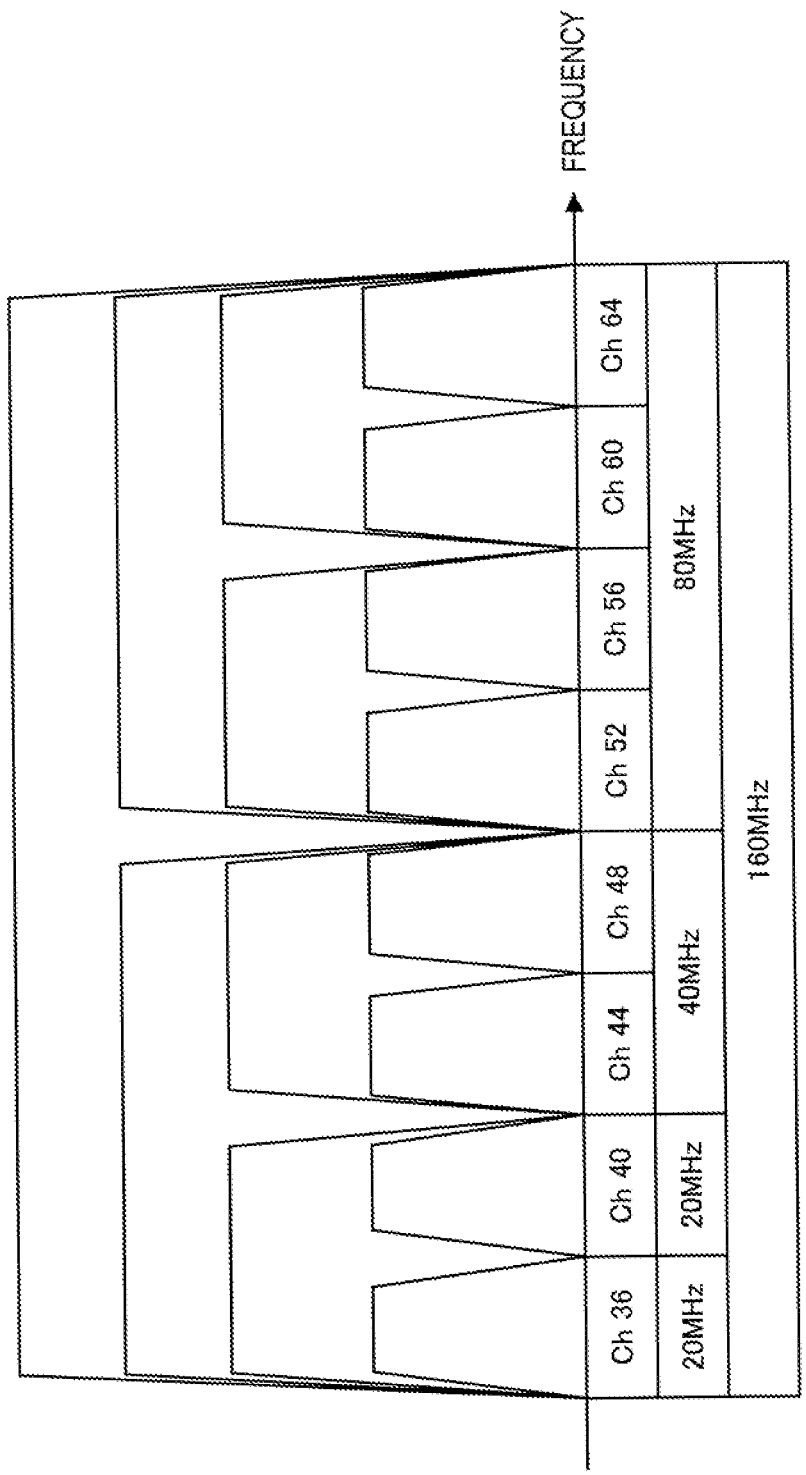
FIG. 8 is a schematic diagram illustrating an example of channel bonding.

Further, the STA 200 may perform the scanning for each frequency. Specifically, the STA 200 executes the scanning for a frequency usable by the STA 200 for a predetermined period of time. Further, the scanning for each frequency will be described with reference to FIG. 8. FIG. 8 is a schematic diagram illustrating an example of channel bonding.

In the related art, the local identifier is allowed to be independently allocated for each frequency channel. For example, as illustrated in FIG. 8, the local identifier is independently allocated to each of eight frequency channels in units of 20 MHz such as Ch.36 to Ch.64. Then, different frequency channels are allocated to neighboring APs as available frequency channels. Therefore, even when the local identifiers overlap between different frequency channels, confusion of communication hardly occurs. Further, it is possible to arrange adjacent APs which correspond in number to frequency channels to be adjacent to one another.

However, in recent years, communication using a bundle of a plurality of frequency channels represented by channel bonding technology has been used. For example, according to the technology, as illustrated in FIG. 8, two frequency channels, four frequency channels, or eight frequency channels are bundled, and communication can be performed between the AP and the STA using the bundled frequency channels. Therefore, if the local identifier is independently allocated for each frequency channel, the local identifiers are likely to overlap in communication using the channel bonding technology. Therefore, confusion of communication as described above may occur. Further, the local identifier may be independently allocated in units of bundled frequency channels, but as the number of bundled frequency channels increases, the number of APs that can be arranged to be adjacent to each other decreases.

In this regard, the STA 200 executes the scanning for each frequency and associates the local identifier obtained by the scanning with a frequency of the first signal including the received local identifier. For example, the control unit 220 causes the wireless communication unit 230 to be on standby for the reception of the first signal for the available frequencies. Then, if the local identifier is obtained by the scanning, the control unit 220 acquires the frequency of the first signal including the local identifier from the wireless communication unit 230. Then, the control unit 220 records the local identifier together with an association between the acquired frequency and the local identifier. Accordingly, as will be described later, the AP 100 which is notified of the information about the local identifier can detect the allocated local identifier for each frequency. Therefore, it is possible for the AP 100 to determine the presence or absence of the overlap of the local identifiers in units of frequencies to which the local identifier is independently allocated.

Further, the first signal including the local identifier is not particularly limited, and any signal may be used as long as the signal includes the local identifier. Specifically, the first signal is a signal transmitted by the communication device 100 (200) or other communication devices. For example, the first signal may be a frame having a very high throughput PLCP protocol data unit (VHT PPDU) format transmitted from the STA or a VHT null data packet (NDP) announcement frame, a beamforming report poll (BRP) frame, or an association response frame which is transmitted from the AP.

A-2. Notification of Collected Local Identifiers

The STA 200 notifies the AP 100 of the collected local identifiers. Specifically, the STA 200 transmits a second signal including second information in which the local identifier specified from the first information included in the received first signal is specified (hereinafter also referred to as "local information").

More specifically, the local information is information indicating the local identifier included in the received first signal, and the second signal is the association request frame. For example, if a participation request to the BSS to which the AP 100 belongs occurs, the control unit 220 generates the local information in which the collected local identifier is specified. Then, the control unit 220 causes the data processing unit 210 to generate the association request frame including the local information, and the generated association request frame is transmitted by the wireless communication unit 230. Further, in a case in which the scanning is performed for each frequency, the local information is generated for each frequency. Further, the local information is set, for example, as a new 24-th information element of the association request frame specified in the IEEE 802.11 standard. Further, the local information will be described in detail with reference to FIG. 9 and FIG. 10. FIG. 9 and FIG. 10 are diagrams illustrating a configuration example of the local information according to the present embodiment.

First, a case in which the local identifier is the AID will be described with reference to FIG. 9. For example, as illustrated in FIG. 9, the local information includes fields such as an Element ID, a Length, a Frequency Channels, a Start AID, and an AID Bitmap. An ID indicating that the information element is the local information is stored in the Element ID field, and information indicating the length of the information element is stored in the Length. Further, information indicating the frequency channel is stored in the Frequency Channels field. Information indicating a start position of the bitmap information stored in the AID bitmap field is stored in the Start AID field, and bitmap information indicating the received AID is stored in the AID bitmap field.

Next, an example in which the local identifier is the PID will be described with reference to FIG. 10. For example, as illustrated in FIG. 10, the local information includes fields such as an Element ID, a Length, and a PID Bitmap set for each frequency channel. A PID received through each frequency channel, for example, bitmap information indicating the COLOR information of the BSS is stored in each of the PID Bitmap fields.

Further, a plurality of pieces of local information may be included in the second signal. For example, both the local information related to the AID and the local information related to the PID are included in the association request frame. In this case, the local information is set as, for example, new 24-th and 25-th information elements of the association request frame specified in the IEEE 802.11 standard.

Further, local identifiers excluding the AD and the PID may be stored with the above configuration. Further, the configuration of the local information is not limited to the above example, and various configurations may be employed.

Further, the local information may be information indicating the overlap of the local identifiers. For example, if the participation request to the BSS to which the AP 100 belongs occurs, the control unit 220 determines the presence or absence of the overlap of the collected local identifiers. In a case in which the local identifiers are determined to overlap, the control unit 220 generates the local information indicating that the local identifiers overlap. Then, the control unit 220 causes the data processing unit 210 to generate the association request frame including the local information, and the generated association request frame is transmitted by the wireless communication unit 230. Further, in addition to the information indicating the overlap, information indicating the overlapping local identifiers may be included in the local information. Further, in a case in which the scanning is performed for each frequency, the local information indicating the overlap of the local identifiers is generated for each frequency.

A-3. Reception of Allocated Local Identifier

The STA 200 receives the local identifier allocated by the AP 100. Specifically, the STA 200 further receives a third signal including a local identifier having a value different from the local identifier related to the second information reported to the AP 100. For example, the third signal is the association response frame.

Specifically, after transmitting the association request frame including the local information, the wireless communication unit 230 is on standby for reception of the association response frame as a response to the association request frame. Then, if the association response frame is received, the data processing unit 210 acquires information in which the local identifier is specified (third information to be described later) from the association response frame. Then, the control unit 220 registers the local identifier specified from the acquired third information. The STA 200 communicates with the AP 100 using the registered local identifier.

Further, if the local identifier is allocated for each frequency the third information includes information indicating an association between the local identifier and the frequency. In this case, the control unit 220 registers the local identifier for each frequency related to the association.

B. Details of Functions of AP

Next, the details of functions of the AP 100 will be described.

B-1. Reception of Collected Local Identifiers

The AP 100 receives a notification of the local identifiers collected by the STA 200. Specifically, the AP 100 receives the second signal including the second information in which the local identifier is specified. More specifically, if the association request frame is received, the data processing unit 110 acquires the local information from the association request frame. Then, the control unit 120 specifies the local identifier on the basis of the acquired local information.

Then, the control unit 120 records the specified local identifier as an allocated local identifier.

Specifically, in a case in which the local information is information indicating the local identifier, the control unit 120 records the local identifier indicated by the local information without change. For example, if the local identifier is the AID, in a case in which a notification of information indicating the AID is given from the STA 200, the control unit 120 records the AID indicated by the information as an allocated AID. Further, the control unit 120 may record the AID indicated by the notified information so that the BSS to which the AID is allocated can be identified. In this case, it is possible to determine whether or not the AIDs overlap between the BSSs. Further, in a case in which the AIDS overlap between the BSSs, the control unit 120 may change the allocation of the AIDs. In this case, it is possible to prevent confusion of communication caused by the overlap of the AIDs by allocating the AID again so that the overlap is eliminated.

Further, in a case in which the local information is information indicating the overlap of the local information the control unit 120 specifies the overlapping local identifiers among the local identifiers allocated to the AP 100, and records the specified local identifier as an allocated local identifier. For example, when the local identifier is the COLOR information of the BSS as the PID, if the information indicating the overlap of the COLOR information is reported from the STA 200, the control unit 120 acquires the COLOR information allocated to the BSS to which the AP 100 belongs (hereinafter also referred to as "its own BSS"), and records the acquired COLOR information as an allocated (hereinafter also referred to as "in-use") COLOR information. Further, when the information indicating the overlapping COLOR information is included, the control unit 120 may record the COLOR information as the in use COLOR information.

Further, in a case in which the frequency and the local identifier are associated, the local identifier is recorded in association with the frequency.

B-2. Allocation of Local Identifier

The AP 100 allocates the local identifier on the basis of the notified local information. Specifically, the AP 100 allocates the local identifiers having a different value from the local identifier specified from the local information included in the second signal received from the STA 200. More specifically, the control unit 120 acquires the recorded allocated local identifier and selects a local identifier that does not overlap the acquired local identifier.

For example, in a case in which the local identifier is the AID, the control unit 120 acquires the recorded allocated AID and allocates an AID having a different value from the acquired AID to the STA 200 which is a transmission source of the association request frame.

Further, in a case in which the local identifier is the COLOR information of the BSS serving as the PID, the control unit 120 acquires the recorded allocated COLOR information and allocates COLOR information having a different value from the acquired COLOR information to the COLOR information of its own BSS again. Further, when the allocated COLOR information is not recorded, that is, the COLOR information does not overlap, the COLOR information is not reallocated. Further, although the COLOR information overlaps, the COLOR information is not allocated again even in a case in which there is no unallocated COLOR information.

Here, the control unit 120 allocates the local identifier independently for each single frequency or every two or more frequencies. For example, in a case in which a unit in which available frequencies are bundled is common between the BSSs, the control unit 120 allocates the AID so that the allocated local identifier, for example, the allocated AID is unique to each unit in which the frequencies are bundled. In this case, since the overlap of the local identifiers is prevented within a range in which the frequencies are bundled, the channel bonding technology can be used while suppressing confusion of communication. Therefore, it is possible to improve the communication efficiency in the communication of the communication device 100 (200).

Further, the control unit 120 may allocate the local identifier in common to a plurality of frequencies. For example, the control unit 120 allocates the AID so that the allocated AID is unique to all available frequencies. In this case, since the overlap of the local identifiers is prevented over all frequencies to be used, the occurrence of confusion of communication due to the overlap of the local identifiers can be reliably suppressed.

B-3. Notification of Allocated Local Identifier

The AP 100 notifies the STA 200 of the allocated local identifier. Specifically, the AP 100 transmits the third signal including the third information in which the local identifier to be allocated by the AP 100 is specified. More specifically, the third signal is the association response frame.

For example, after the local identifier is allocated, the control unit 120 generates information indicating the allocated local identifier. Then, the control unit 120 causes the data processing unit 110 to generate the association response frame including the information indicating the local identifier, and the generated association response frame is transmitted by the wireless communication unit 130. Further, in a case in which the local identifier is allocated for each frequency, the information indicating the local identifier is generated for each frequency.

Further, the above example has been described with the example in which the association response frame is transmitted, but other frames may be used for the notification of the allocated local identifier. Specifically, a specific frame including a local identifier addressed or broadcast to the STA 200 may be transmitted as the third signal. More specifically, the specific frame is a frame transmitted at predetermined time intervals. For example, the specific frame is a beacon frame. Further, the example in which the specific frame is a beacon frame of a management frame has been described, but the specific frame may be a frame of any one type of the management frame, a control frame, and a data frame.

2-3. Processes of Communication Devices

Then, a process of the communication device 100 (200) according to the present embodiment will be described.

Overview of Process

Figure 11:
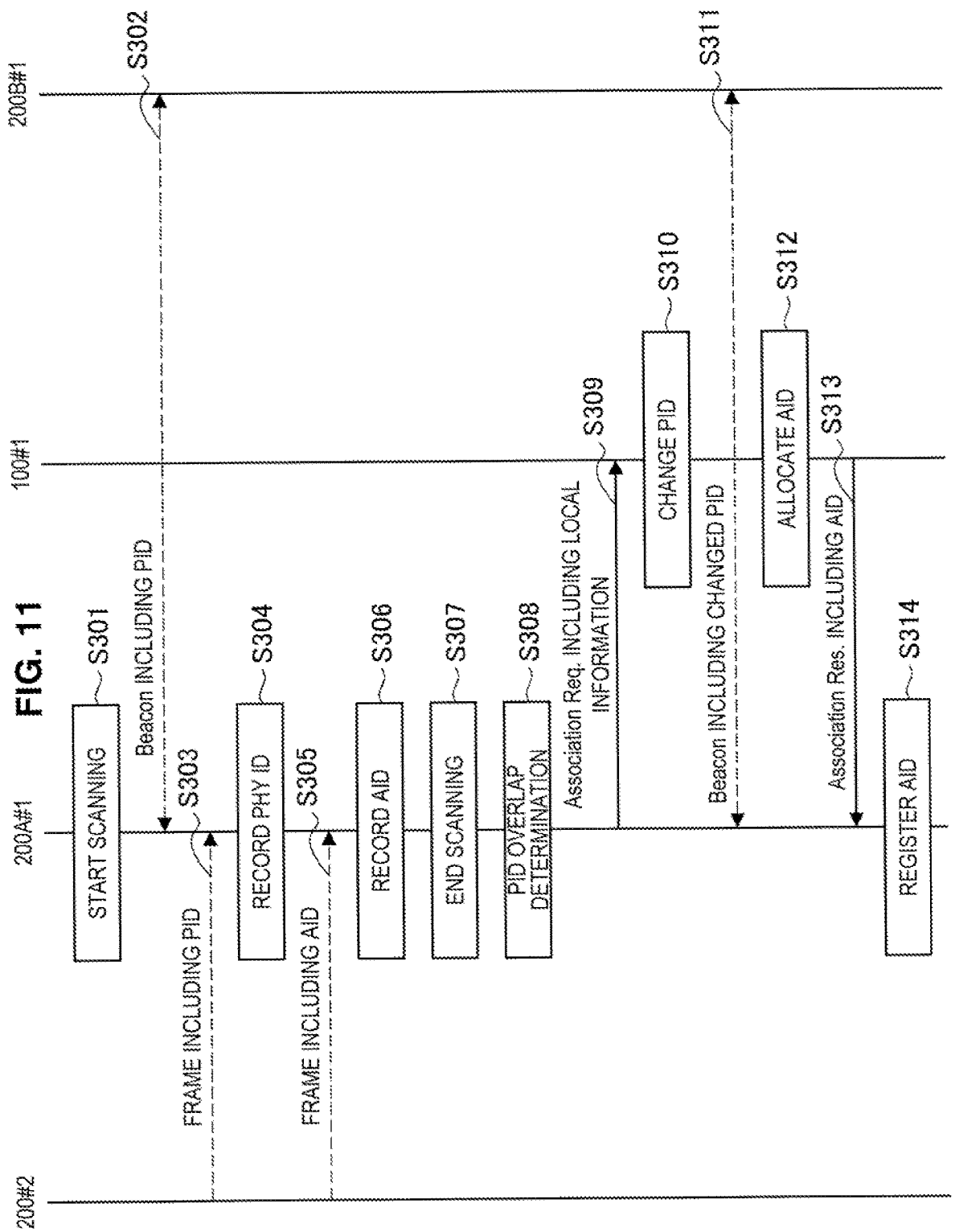
FIG. 11 is a sequence diagram conceptually illustrating an overview of a process of a communication device according to the embodiment.

First, an overview of a process of the communication device 100 (200) according to the present embodiment will be described with reference to FIG. 11. FIG. 11 is a sequence diagram conceptually illustrating an overview of a process of the communication device 100 (200) according to the present embodiment. FIG. 11 illustrates a series of processes until the STA 200A #1 notifies the AP 100 #1 of the collected local information using the association request frame, and the AP 100 #1 notifies of the AID to be allocated the STA 200A #1 on the basis of the local information.

The STA 200A #1 starts the scanning (step S301). Specifically, the control unit 220 causes the data processing unit 210 and the wireless communication unit 230 to be on standby for reception of a signal addressed to another communication device.

After starting the scanning, the STA 200A #1 receives the beacon frame including the PID from the AP 100 #1 (step S302). More specifically, in a case in which the beacon frame is received from the AP 100 #1, the data processing unit 210 acquires the PID of the AP 100 #1 included in the beacon frame. Further, in a case in which the PID is included in the PLCP header, the wireless communication unit 230 may acquire the PID included in the PLCP header of the beacon frame.

Further, the STA 200A #1 receives a frame including the PID from the STA 200 #2 belonging to another BSS different from the BSS to which the AP 100 #1 belongs (step S303). Specifically, if the frame is received from the STA 200 #2, the wireless communication unit 230 acquires the PID included in the PLCP header of the frame.

Then, the STA 200A #1 records the PID included in the received frame (step S304). Specifically, the control unit 220 records the acquired PID.

Further, the STA 200A #1 receives a frame including the AID from the STA 200 #2 (step S305). Specifically, for example, if a frame having the VHT PPDU format is received from the STA 200 #2, the data processing unit 210 acquires the AID included as information indicating transmission source or destination of the frame.

Then, the STA 200A #1 records the AID included in the received frame (step S306). Specifically, the control unit 220 records the acquired AID.

Then, the STA 200A #1 ends the scanning (step S307). Specifically, the control unit 220 ends the scanning if a predetermined time elapses from the start of the scanning.

Then, the STA 200A #1 determines whether or not the PIDs overlap (step S308). Specifically, the control unit 220 determines whether or not the PID allocated to its own BSS and the recorded PID overlap.

Then, the STA 200A #1 transmits the association request frame including the local information to the AP 100 #1 (step S309). Specifically, if the participation request to the BSS to which the AP 100 #1 belongs occurs, the control unit 220 generates the local information on the basis of the recorded PID and AID. Then, the control unit 220 causes the data processing unit 210 to generate the association request frame including the generated local information, and the generated association request frame is transmitted by the wireless communication unit 230.

Upon receiving the association request frame, the AP 100 #1 changes the PID on the basis of the local information (step S310). Specifically, if the association request frame is received, the control unit 120 records the PID specified from the local information included in the association request frame as the in use PID. Then, the control unit 120 changes the PID on the basis of the presence or absence of the overlap of the in use PIDs and the PID of its own BSS.

Then, the AP 100 #1 transmits a beacon frame including the changed PID (step S311). Specifically, if the PID is changed, the control unit 120 causes the data processing unit 110 to generate the beacon frame including the changed PID. Then, the generated beacon frame is transmitted by the wireless communication unit 130.

Then, the AP 100 #1 allocates the AID on the basis of the local information (step S312). Specifically, the control unit 120 records the AID specified from the local information as the allocated AID. Then, the control unit 120 allocates an AID having a different value from the allocated AID to the STA 200A #1.

Then, the AP 100 #1 transmits the association response frame including the allocated AID to the STA 200A #1 (step S313). Specifically the control unit 120 causes the data processing unit 110 to generate the association response frame including the allocated AID, and the generated association response frame is transmitted by the wireless communication unit 130.

Upon receiving the association response frame, the STA 200A #1 registers the allocated AID (step S314). Specifically, if the association response frame is received, the data processing unit 210 acquires the AID included in the association response frame. Then, the control unit 220 registers the acquired AID as the AID allocated to the STA 200A #1.

Process of STA

Figure 12:
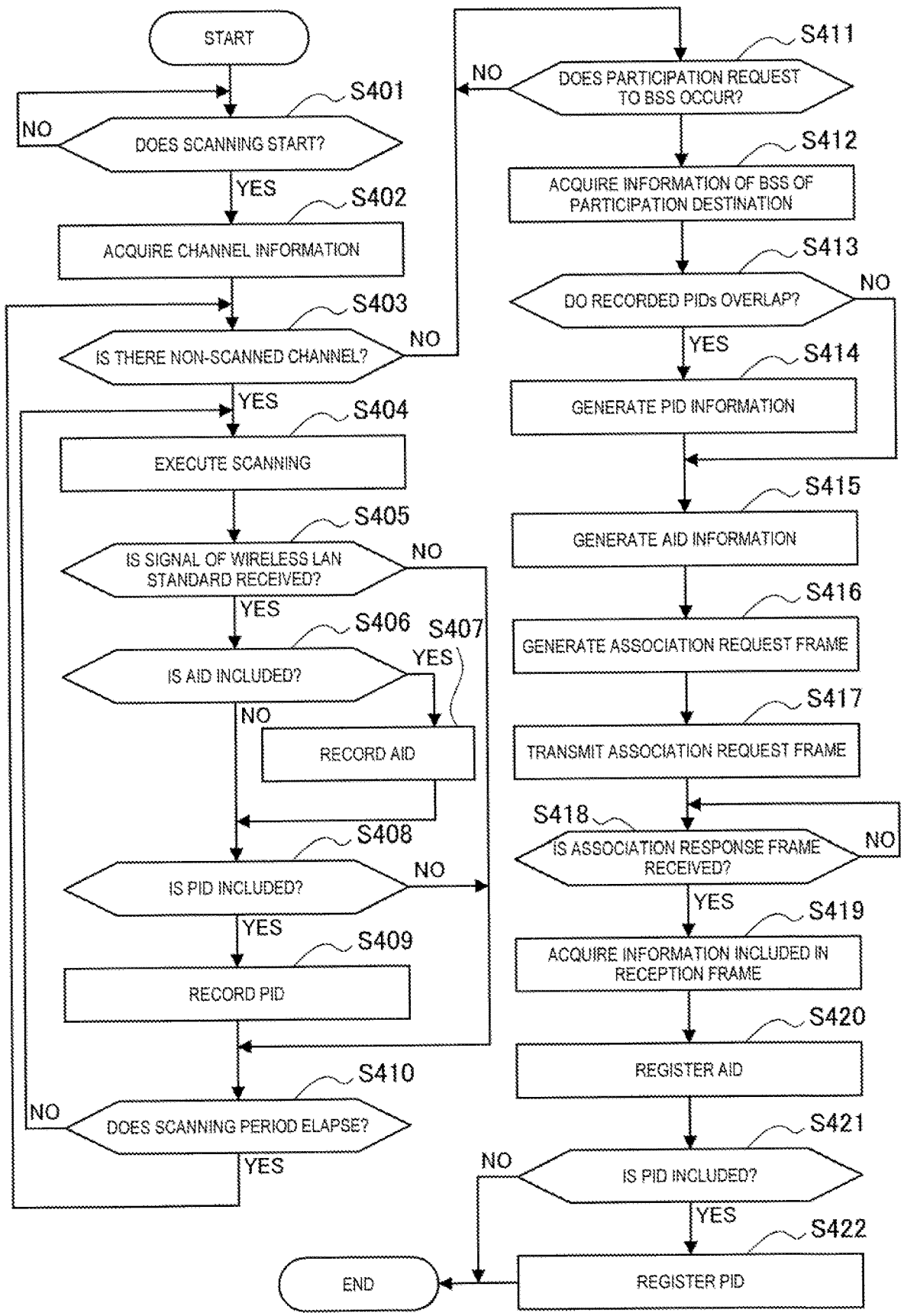
FIG. 12 is a flowchart conceptually illustrating the details of a process of an STA according to the embodiment.

Next, the process of the STA 200 according to the present embodiment will be described in detail with reference to FIG. 12. FIG. 12 is a flowchart conceptually illustrating a process of the STA 200 according to the present embodiment in detail.

The STA 200 determines whether or not the scanning starts (step S401). Specifically, the control unit 220 determines whether or not the scanning starts in a case in which the power is turned on, and the STA 200 is activated. If the scanning is determined to starts, the control unit 220 causes the data processing unit 210 and the wireless communication unit 230 to prepare for execution of the scanning.

Then, the STA 200 acquires channel information (step S402). Specifically, the control unit 220 acquires information indicating the frequency channel available to the STA 200.

Then, the STA 200 determines the presence or absence of a non-scanned channel (step S403). Specifically, the control unit 220 determines the presence or absence of a frequency channel which does not undergone the scanning among frequency channels to be acquired.

In a case in which there is a non-scanned channel, the STA 200 executes the scanning (step S404). Specifically, the control unit 220 causes the scanning to be executed on the frequency channel which has not undergone the scanning yet.

Then, the STA 200 determines whether or not the received signal is a signal of a wireless LAN standard (step S405). Specifically, the wireless communication unit 230 determines whether or not the received signal is a signal of a wireless LAN standard on the basis of a reception time, a frequency, or the like of the received signal.

If the received signal is determined to be a signal of the wireless LAN standard, the STA 200 determines whether or not the AID is included (step S406). Specifically, if the received signal is determined to be a signal of the wireless LAN standard, the wireless communication unit 230 performs a reception process on the signal. Then, the data processing unit 210 determines whether or not the AID is included in a frame obtained by the reception process. Further, in a case in which the AID is included in the PLCP header, the presence or absence of AID may be determined by the wireless communication unit 230.

If the AID is determined to be included, the STA 200 records the AID (step S407). Specifically, if the AID is determined to be included in the received signal, the data processing unit 210 acquires the AID, and the control unit 220 records the acquired AID.

Then, the STA 200 determines whether or not the PID is included (step S408). Specifically, the wireless communication unit 230 determines whether or not the PID is included in the PLCP header. Further, the data processing unit 210 determines whether or not the PID is included in the frame obtained by the reception process.

If the PID is determined to be included, the STA 200 records the PID (step S409). Specifically, if the PID is determined to be included in the received signal, the wireless communication unit 230 acquires the PID, and the control unit 220 records the acquired PID.

Then, the STA 200 determines whether or not the scanning period elapses (step S410). Specifically, the control unit 220 determines whether or not a predetermined period of time elapses since the scanning starts. If the predetermined period is determined to elapse, the control unit 220 ends the scanning for the frequency.

If the scanning is determined to be completed for all the channels in step S403, the STA 200 determines whether or not a BSS participation request occurs (step S411). Specifically, the control unit 220 determines whether or not a data transmission request to the AP 100 occurs on the basis of the participation request to the BSS, for example, an input of instructing a connection to the BSS from the user.

If the BSS participation request is determined to occur, the STA 200 acquires the information of a BSS of a participation destination (step S412). Specifically, if the participation request to the BSS occurs, the control unit 220 acquires information about the BSS of a participation target, for example, information such as an address of the AP 100, a BSSID, and a frequency channel. Further, the information about the BSS may be information included in the beacon frame transmitted from the AP 100.

Then, the STA 200 determines the presence or absence of the overlap of the recorded PIDs (step S413). Specifically, the control unit 220 determines whether or not the recorded PIDs overlap.

If the PIDs are determined to overlap, the STA 200 generates PID information on the basis of the overlap of the PIDs (step S414). Specifically, in a case in which the recorded PIDs overlap, the control unit 220 generates the PID information indicating the overlap of the PIDs. Further, in a case in which the PID is managed for each frequency channel, when there is an overlap of the PIDs in the use frequency channel of the AP 100 or a frequency channel other than the use frequency channel, the control unit 220 transmits the PID information indicating the overlap of the PIDs.

Then, the STA 200 generates AID information on the basis of the recorded AID (step S415). Specifically, the control unit 220 generates information indicating the recorded AID. Further, in a case in which the AID is managed for each frequency channel, the control unit 220 generates the AID information indicating the AID for each frequency channel.

Then, the STA 200 generates the association request frame including the PID information and the AID information (step S416). Specifically, the control unit 220 causes the data processing unit 210 to generate the association request frame including the PID information and the AID information generated as the local information.

Then, the STA 200 transmits the association request frame (step S417). Specifically, the wireless communication unit 230 transmits the generated association request frame through the use frequency channel of the AP 100 serving as the destination.

Then, the STA 200 is on standby until the association response frame is received (step S418). Specifically, after transmitting the association request frame, the wireless communication unit 230 is on standby for reception of the association response frame.

If the association response frame is received, the STA 200 acquires the information included in the reception frame (step S419). Specifically, if the association response frame is received, the data processing unit 210 acquires information in which the local identifier included in the association response frame is specified.

Then, the STA 200 registers the AID on the basis of the acquired information (step S420). Specifically, the control unit 220 registers the AID acquired from the association response frame as the AID allocated to the STA 200.

Then, the STA 200 determines whether or not the PID is included in the reception frame (step S421). Specifically, the control unit 220 determines whether or not the PID is included in the information acquired from the association response frame.

If the PID is determined to be included in the reception frame, the STA 200 registers the PID (step S422). Specifically, in a case in which the PID is included in the information in which the local identifier is specified, the control unit 220 registers the PID as the PID for the BSS of the participation destination.

Process of AP

Figure 13:
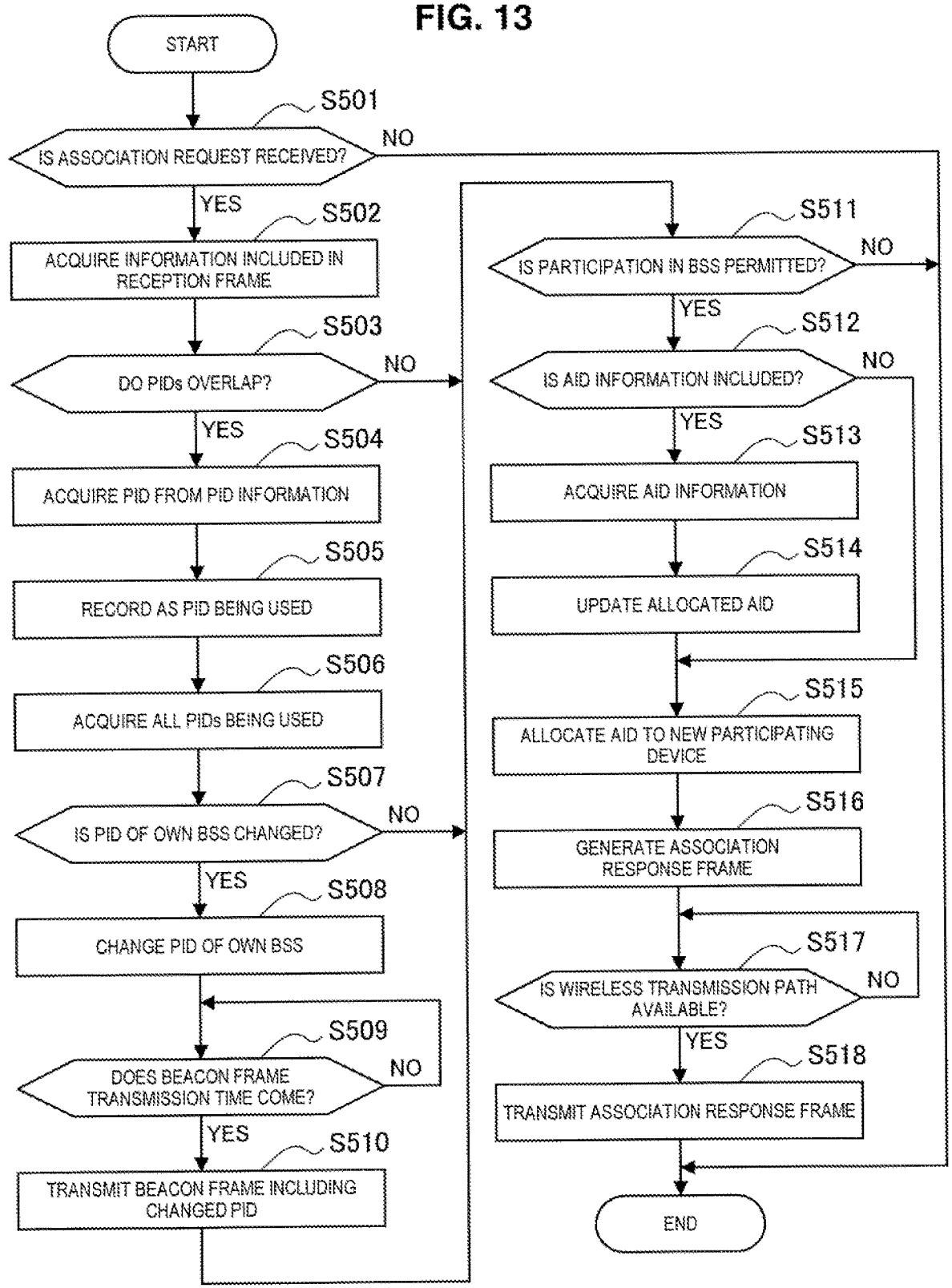
FIG. 13 is a flowchart conceptually illustrating the details of a process of an AP according to the embodiment.

Further, the process of the AP 100 according to the present embodiment will be described in detail with reference to FIG. 13. FIG. 13 is a flowchart conceptually illustrating the process of the AP 100 according to the present embodiment in detail.

The AP 100 determines whether or not the reception frame is the association request frame (step S501). More specifically, the data processing unit 110 determines whether or not a frame obtained by the reception process of the wireless communication unit 130 is the association request frame.

If the reception frame is determined to be the association request frame, the AP 100 acquires information included in the reception frame (step S502). Specifically, if the association request frame is determined to be received, the data processing unit 110 acquires the local information included in the association request frame.

Then, the AP 100 determines the presence or absence of the overlap of PIDs on the basis of the acquired information (step S503). Specifically, the control unit 120 determines whether or not the PID information indicating the overlap of the PIDs is included in the acquired local information.

if the PIDs are determined to overlap, the AP 100 acquires the PID being used in a surrounding BSS from the PID information (step S504). Specifically, if the PID information indicating the overlap of the PIDs is determined to be included, the control unit 120 acquires the overlap PID, that is, the PID being used in the surrounding BSS from the PID information. Further, in a case in which the PID information includes only the information indicating the overlap of the PIDs, the process of this step is not performed, and the process proceeds to step S506.

Then, the AP 100 records the acquired PID as the PID being used in the surrounding BSS (step S505). Specifically, the control unit 120 additionally records the acquired PID along with a time at which it is recorded as the PID being used in the surrounding BSS.

Then, the AP 100 acquires all the PIDs being used in the surrounding BSS (step S506). Specifically, the control unit 120 acquires all the PIDs being used in the surrounding BSS recorded on the basis of the collection of the local information from the STA 200.

Then, the AP 100 determines whether or not the PID of its own BSS is changed (step S507). Specifically, the control unit 120 acquires the PID allocated to its own BSS. Then, the control unit 120 determines whether or not each of the PIDs being used in the surrounding BSS overlap the PID assigned to the own BSS. In a case in which the PID of its own BSS is determined to overlap any of the PIDs being used, the control unit 120 determines whether or not there is an unallocated PID that does not overlap any of the PIDs being used. In a case in which it is determined that there is an unallocated PID, the control unit 120 determines to change the PID. In a case in which there is no unallocated PID, the control unit 120 determines not to change the PID, and the process proceeds to step S511. Further, in the case in which there is no unallocated PID, and the PID is recorded together with the recorded time, the PID in which a predetermined time elapses since the recorded time may be dealt as unallocated PID. Further, if a predetermined time elapses since the PID is recorded, the PID in which a predetermined time elapses since the recording may be deleted. As described above, since the PID for the BSS that is less likely to overlap is used, the occurrence of the overlap of the PIDs caused by depletion of the PID can be suppressed. Further, in a case in which the local information is managed for each frequency channel, when the PIDs overlap in the frequency channel used in the AP 100 or when the PIDs overlap in a frequency channel other than the frequency channel used in the AP 100, the PID is determined to be changed.

If the PID of its own BSS is determined to be changed, the AP 100 changes the PID of its own BSS to a PID that does not overlap (step S508). Specifically, if the PID is determined to be changed, the control unit 120 allocates an unallocated PID as the PID of its own BSS again.

Then, the AP 100 determines whether or not a transmission time of the beacon frame comes (step S509). Specifically, the control unit 120 determines whether or not the transmission time of the beacon frame comes.

If the transmission time of the beacon frame is determined to come, the AP 100 transmits the beacon frame including the changed PID (step S510). Specifically, if the transmission time of the beacon frame is determined to come, the control unit 120 causes the data processing unit 110 to generate the beacon frame including the changed PID. Then, the generated beacon frame is transmitted by the wireless communication unit 130.

Then, the AP 100 determines whether or not the STA 200 is permitted to participate in its own BSS (step S511). Specifically, the control unit 120 determines whether or not the STA 200 which is the transmission source of the association request frame is permitted to participate in its own BSS.

If the participation in the STA 200 is determined to be permitted to participate in its own BSS, the AP 100 determines whether or not the AID information is included in the received association request flame (step S512). Specifically, if the participation in the STA 200 is determined to be permitted to participate in its own BSS, the control unit 120 determines whether or not the AID information is included in the local information acquired in step S502.

If the AID information is determined to be included, the AP 100 acquires the AID information (step S513). Specifically, if the AID information is determined to be included in the local information, the control unit 120 acquires the AID information.

Then, the AP 100 updates the allocated AID on the basis of the acquired AID information (step S514). Specifically, in a case in which the AID indicated by the acquired AID information is not recorded as the allocated AID, the control unit 120 additionally records the AID as the allocated AID. Further, similarly to the deletion of the record of the previous PID described above, the record of the AID in which a predetermined time elapses from the recording may be deleted.

Then, the AP 100 allocates the AID to a new participating device (step S515). Specifically, the control unit 120 allocates an AID that does not overlap the allocated AID to the STA 200 which is the transmission source of the association request frame.

Then, the AP 100 generates the association response frame (step S516). Specifically the control unit 120 causes the data processing unit 110 to generate the association response frame including the allocated AID.

Then, the AP 100 determines whether or not a wireless transmission path is available (step S517). Specifically, the wireless communication unit 130 determines whether or not the wireless transmission path is available by performing a carrier sense process or the like.

If the wireless transmission path is determined to be available, the AP 100 transmits the association response frame (step S518). Specifically, if the wireless transmission path is determined to be available, the wireless communication unit 130 transmits the generated association response frame.

2-4. Conclusion of Present Embodiment

Therefore, according to one embodiment of the present disclosure, the STA 200 receives the first signal addressed to another communication device including the first information in which the local identifier which is used in the wireless LAN and different from the global identifier is specified and transmits the second signal including the second information in which the local identifier specified from the first information included in the received first signal is specified. Further, the AP 100 receives the second signal including the second information in which the local identifier is specified and transmits the third signal including the third information in which the local identifier allocated by the AP 100 is specified. Therefore, the AP 100 that allocates the local identifier can detect the local identifiers allocated by other BSSs. Therefore, the allocation of the local identifier overlapping the local identifiers allocated by other BSSs is prevented, and thus it is possible to suppress confusion in communication using the local identifier even in the OBSS environment.

Further, the local identifier includes an identifier allocated to the communication device. Therefore, it is possible to reduce a possibility of communication of the AP 100 with the communication device erroneously selected due to the overlap of the local identifiers. Further, it is possible to prevent the STA 200 to which the same local identifier is allocated from erroneously recognizing the signal addressed to another STA 200 as the signal addressed to the STA 200.

Further, the identifier allocated to the communication device includes an association identifier. Therefore, it is possible to reduce the possibility of the overlap of association identifiers between the overlapping BSSs. Therefore, it is possible to suppress the occurrence of confusion in communication using the association identifier.

Further, the local identifier includes an identifier allocated to the wireless communication network. Therefore, it is possible to suppress useless communication, a setting of the transmission stop period, and the like which are caused by the erroneous recognition of the BSS. Therefore, it is possible to suppress a decrease in use efficiency of wireless communication resources.

Further, the identifier allocated to the wireless communication network includes the information identifying the BSS in the physical layer. Therefore, the STA 200 can avoid erroneously recognizing signals addressed to other STAs 200 as the signal addressed to the STA 200 in the reception process of the physical layer. Therefore, the accuracy of a signal destination determination process in the physical layer is improved, and it is possible to suppress a decrease in efficiency of the reception process.

Further, the second information includes the information indicating the local identifier included in the received first signal. Therefore, the STA 200 can notify the AP 100 of the local identifier without performing any additional process. The AP 100 can also specify the local identifier from the local information without performing an additional process.

Further, the second information includes the information indicating the overlap of the local identifiers. Therefore, the size of the local information can be reduced as compared with the case in which the information indicating the local identifier is included in the local information. Therefore, the amount of communication is reduced, and communication resources can be used for other purposes.

Further, the second information is associated with the frequency of the received first signal. Further, the local identifier is independently allocated for each single frequency or every two or more frequencies. Therefore, the allocated local identifiers are collected for each frequency and notified of, and thus the overlap of the local identifiers can be allowed between different frequencies while preventing the overlap of the local identifiers in units of frequencies. Therefore, it is possible to suppress a reduction in a substantial range of available local identifiers, and it is possible to suppress the depletion of the local identifier. As a result, it is possible to improve admissibility of, for example, an arrangement of the APs 100 in which the BSSs overlap.

Further, the second signal includes the association request frame. Therefore, when the participation request to the BSS is made before the local identifier is allocated, the notification of the allocated local identifier is given to the AP 100, and thus it is possible to efficiently allocate non-overlapping local identifiers. Further, since the existing frames are used, it is possible to prevent an increase in the communication amount.

Further, the STA 200 further receives the third signal including the local identifier having a value different from the local identifier related to the second information. Further, the AP 100 transmits the third signal including the information in which the local identifier having a value different from the local identifier specified from the second information is specified. Therefore, since the local identifier having a different value from the local identifiers collected by the STA 200 is allocated, it is possible to reduce the possibility of the overlap of the local identifiers between the BSSs.

Further, the local identifier is allocated in common to a plurality of frequencies. Therefore, it is possible to reliably prevent the overlap of the local identifiers by allocating the local identifier that does not overlap the allocated local identifier over the used frequency.

Further, the third signal includes the association response frame. In the association which is a procedure of participating in the BSS, it is easy to allocate the local identifier. In this regard, as in this configuration, the notification of other local identifiers is given to the STA 200 together with the allocated AID using the association response frame, and thus it is possible to notify of the allocated local identifiers efficiently. Further, since the existing frames are used, it is possible to prevent an increase in the communication amount.

Further, the third signal includes the frame transmitted at predetermined time intervals. Here, it is preferable that the notification of the allocated local identifiers is given to all the STAs 200 in the BSS. Particularly, in a case in which the local identifier is the PID for the BSS, if the PIDs do not coincide between the AP 100 and the STA 200, a possibility of failure of communication increases. In this regard, as in this configuration, the notification of the local identifier is given to the STA 200 via the frame transmitted at predetermined time intervals, and thus it is possible to improve the certainty that the STA 200 receives the local identifier.

3. Application Example

The technology according to the present disclosure can be applied to various products. For example, the communication device 20 may be realized as mobile terminals such as smartphones, tablet personal computers (PCs), notebook PCs, portable game terminals, or digital cameras, axed-type terminals such as television receivers, printers, digital scanners, or network storages, or car-mounted terminals such as car navigation devices. In addition, the communication device 200 may be realized as terminals that perform machine to machine (M2M) communication (also referred to as machine type communication (MTC) terminals) such as smart meters, vending machines, remotely controlled monitoring devices, or point of sale (POS) terminals. Furthermore, the communication device 200 may be wireless communication modules mounted in such terminals (for example, integrated circuit modules configured by one die).

On the other hand, for example, the communication device 10 may be realized as a wireless LAN access point (also referred to as a wireless base station) which has a router function or does not have a router function. The communication device 100 may be realized as a mobile wireless LAN router. The communication device 100 may also be a wireless communication module (for example, an integrated circuit module configured with one die) mounted on such a device.

3-1. First Application Example

Figure 14:
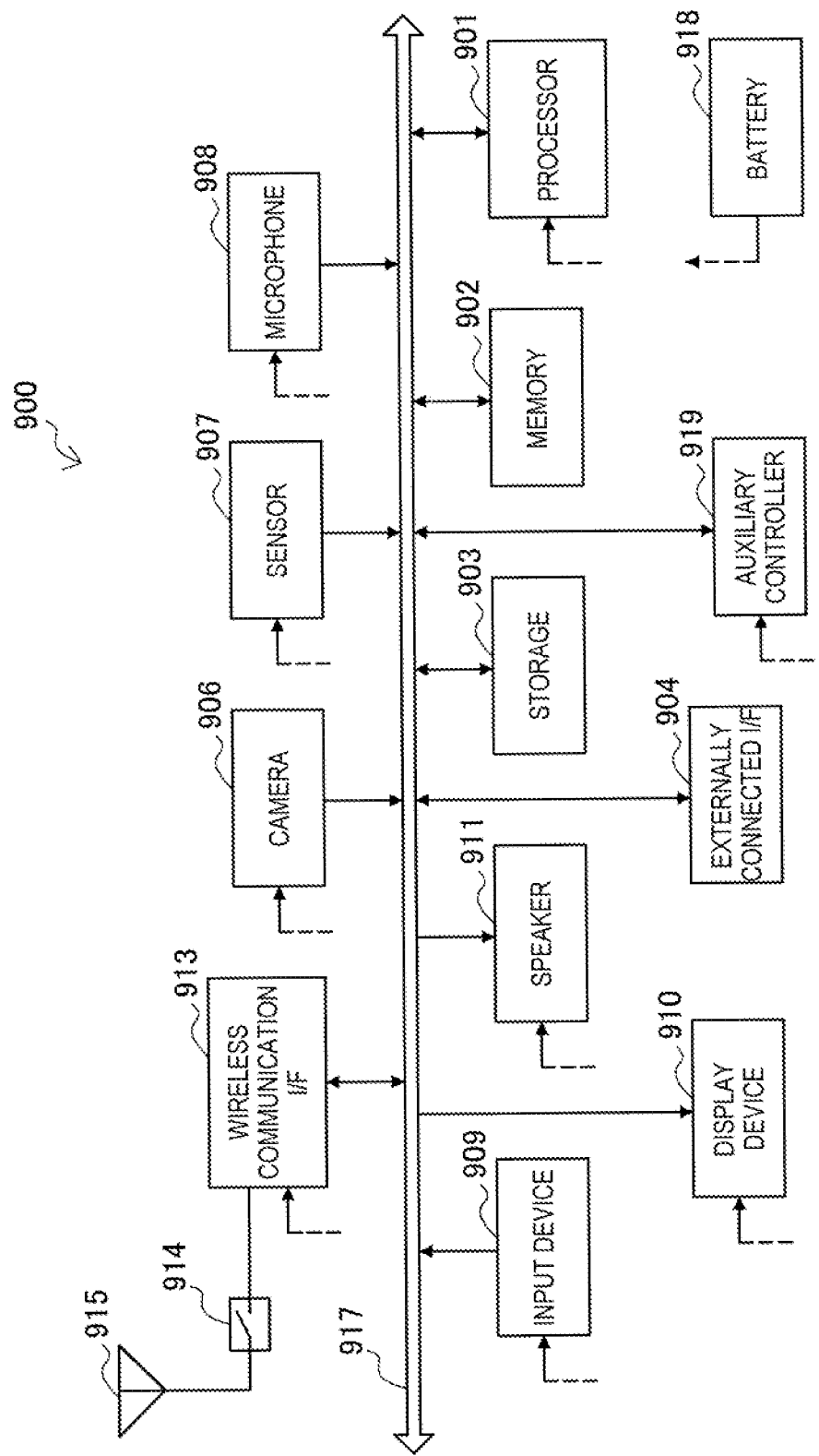
FIG. 14 is a block diagram illustrating an example of a schematic configuration of a smartphone.

FIG. 14 is a block diagram illustrating an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad a keyboard buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another deice via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 14. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 14 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 14, the data processing unit 210, the control unit 220, and the wireless communication unit 230 described above with reference to FIG. 7 may be implemented in the wireless communication interface 913. Further, at least some of the functions may be implemented in the processor 901 or the auxiliary controller 919. For example, the local identifier is acquired from the signal addressed to another communication device obtained by the reception process of the data processing unit 210 and the wireless communication unit 230, and the control unit 220 generates the local information in which the acquired local identifier is specified. Then, the signal including the generated local information is transmitted by the wireless communication unit 230. Accordingly, the notification of the already allocated local identifier is given to the communication counterpart of the smartphone 900, and thus the communication partner can allocate the non-overlapping local identifier to the smartphone 900 or the communication device belonging to the same BSS as the smartphone 900. Therefore, it is possible to reduce the possibility of confusion in communication using the local identifier.

Note that the smartphone 900 may operate as a wireless access point (software AP) as the processor 901 executes the function of an access point at an application level. In addition, the wireless communication interface 913 may have the function of a wireless access point.

3-2. Second Application Example

Figure 15:
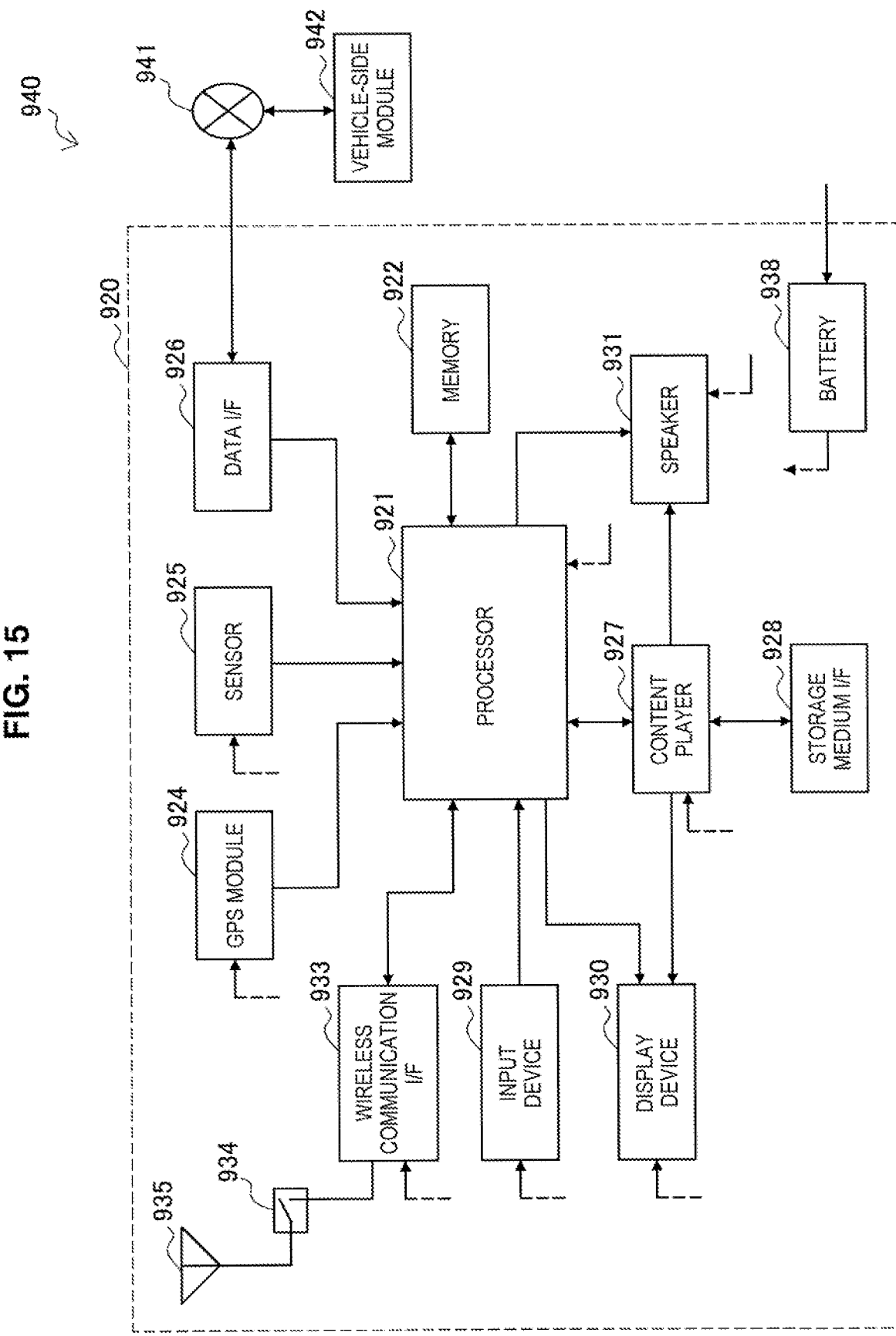
FIG. 15 is a block diagram illustrating an example of a schematic configuration of a car navigation device.

FIG. 15 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 15. In this case, the antenna switch 934 may be omitted from the configuration of the car navigation device 920.

The battery 938 supplies electric power to each of the blocks of the car navigation device 920 illustrated in FIG. 15 via power supply lines partially indicated by dashed lines in the drawing. In addition, the battery 938 accumulates electric power supplied from the vehicle side.

In the car navigation device 920 illustrated in FIG. 15, the data processing unit 210, the control unit 220, and the wireless communication unit 230 described above with reference to FIG. 7 may be implemented in the wireless communication interface 933. Further, at least some of the functions may be implemented in the processor 921. For example, the local identifier is acquired from the signal addressed to another communication device obtained by the reception process of the data processing unit 210 and the wireless communication unit 230, and the control unit 220 generates the local information in which the acquired local identifier is specified. Then, the signal including the generated local information is transmitted by the wireless communication unit 230. Accordingly, the notification of the already allocated local identifier is given to the communication counterpart of the car navigation device 920, and thus the communication partner can allocate the non-overlapping local identifier to the car navigation device 920 or the communication device belonging to the same BSS as the car navigation device 920. Therefore, it is possible to reduce the possibility of confusion in communication using the local identifier.

Further, the wireless communication interface 933 may operate as the communication device 100 and provide a wireless connection to the terminal possessed by the user riding in the vehicle. At that time, for example, the car navigation device 920 allocates the local identifier to the terminal possessed by the user on the basis of the received local information and transmits a signal including information in which the allocated local identifier is specified to the terminal possessed by the user. Accordingly, it is possible to prevent the local identifier allocated to the terminal possessed by the user from overlapping the local identifier allocated to other terminals. Therefore, it is possible to reduce the possibility of the occurrence of confusion in the communication between the car navigation device 920 and the terminal possessed by the user.

Further, the technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

3-3. Third Application Example

Figure 16:
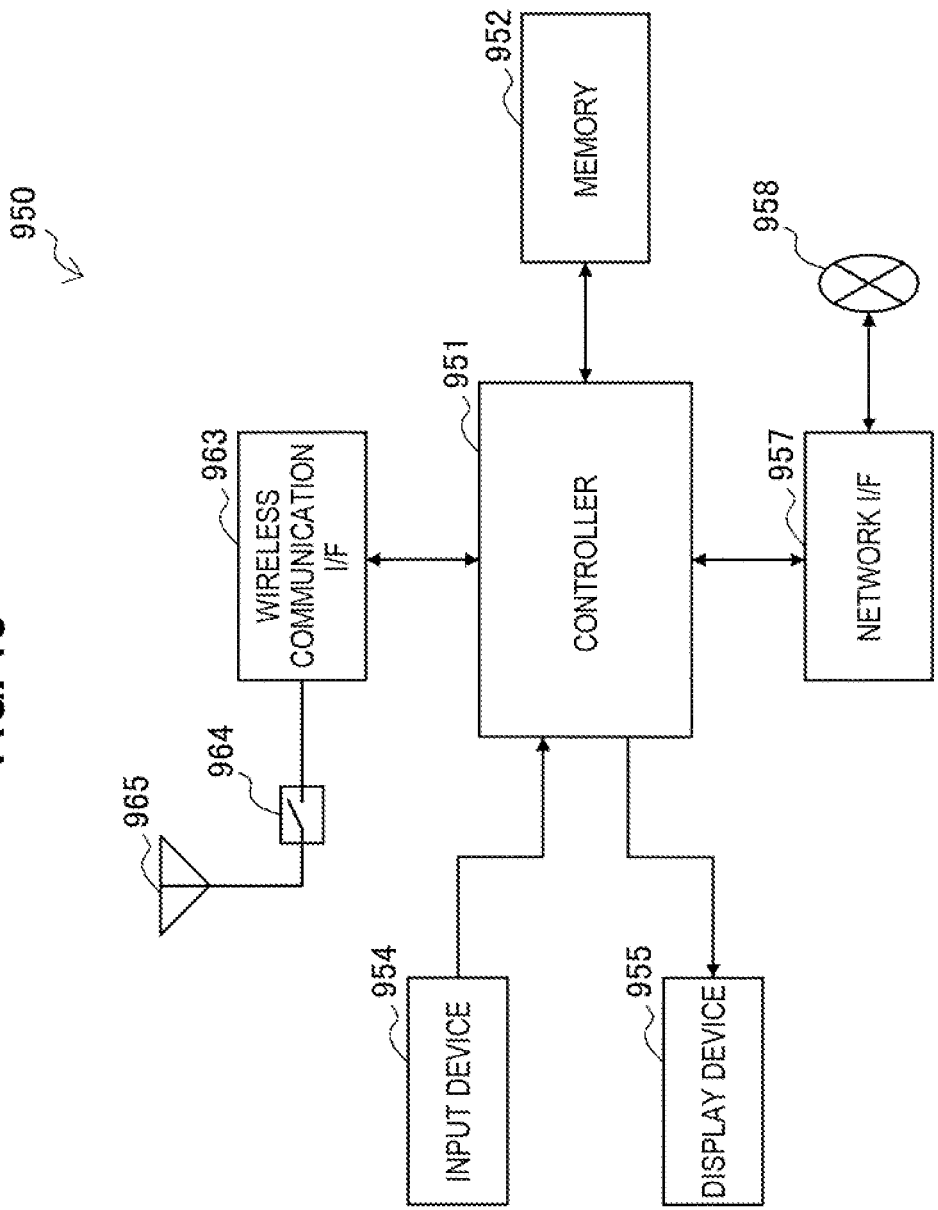
FIG. 16 is a block diagram illustrating an example of a schematic configuration of a wireless access point.

FIG. 16 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 16, the data processing unit 110, the control unit 120, and the wireless communication unit 130 described above with reference to FIG. 7 may be implemented in the wireless communication interface 963. Further, At least some of the functions may be implemented in the controller 951. For example, the wireless access point 950 allocates the local identifier to the STA connected with the wireless access point 950 on the basis of the received local information and transmits a signal including information in which the allocated local identifier is specified to the STA. Accordingly, it is possible to prevent the local identifier allocated to the STA from overlapping the local identifier allocated to other STAs. Therefore, it is possible to reduce the possibility of the occurrence of confusion in the communication between the wireless access point 950 and the STA.

4. Conclusion

As described above, according to one embodiment of the present disclosure, the AP 100 which allocates a local identifier can detect the local identifiers allocated by other BSSs. Therefore, the allocation of the local identifier overlapping the local identifiers allocated by other BSSs is prevented, and thus it is possible to suppress confusion in communication using the local identifier even in the OBSS environment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the association request frame is used for the notification of the local identifier to the AP 100, but the present technology is not limited to such an example. For example, in a case in which the association process is already performed, a specific frame including the local identifier addressed to the AP 100 may be transmitted. Further, the specific frame may be a frame of any one type of the data frame, the management frame, and a control frame.

Further, in the above embodiment, the example in which the overlap determination of the local identifier is performed in the STA 200 has been described, but the overlap determination of the local identifier may be performed in the AP 100. Specifically, the STA 200 notifies the AP 100 of the local information including a set of the local identifier and the information identifying the BSS. Then, the AP 100 determines whether or not the local identifier of the BSS matching its own BSS is included in the notified local information. In this case, since the overlap determination process in the STA 200 can be omitted, it is possible to reduce the processing load and the power consumption in the STA 200.

Further, in the above embodiment, the example in which only the STA 200 collects the local identifiers has been described, but in addition to this, the AP 100 may collect the local identifiers. For example, the AP 100 #1 may record the local identifier included in the signal received from the STA 200 #2 as illustrated in FIG. 4B.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed in parallel or individually as well. Further, it is needless to say that even in steps which are processed chronologically, the order can be appropriately changed depending on circumstances.

Additionally, the present technology may also be configured as below.

(1)

A communication device, including:

a communication unit configured to receive a first signal addressed to another communication device including first information in which a local identifier which is used in a wireless local area network (LAN) and different from a global identifier is specified, and configured to transmit a second signal including second information in which the local identifier specified from the first information included in the received first signal is specified.

(2)

The communication device according to (1), in which the local identifier includes an identifier allocated to a communication device.

(3)

The communication device according to (2), in which the identifier allocated to the communication device includes an association identifier.

(4)

The communication device according to any one of (1) to (3), in which the local identifier includes an identifier allocated to a wireless communication network.

(5)

The communication device according to (4), in which the identifier allocated to the wireless communication network includes information for identifying a basic service set (BSS) in a physical layer.

(6)

The communication device according to any one of (1) to (5), in which the second information includes information indicating the local identifier included in the received first signal.

(7)

The communication device according to any one of (1) to (6), in which the second information includes information indicating an overlap of the local identifiers.

(8)

The communication device according to any one of (1) to (7), in which the second information is associated with a frequency of the received first signal.

(9)

The communication device according to any one of (1) to (8), in which the second signal includes an association request frame.

(10)

The communication device according to any one of (1) to (9), in which the communication unit further receives a third signal including third information in which the local identifier having a value different from a value of the local identifier related to the second information is specified.

(11)

A communication device, including:

a communication unit configured to receive a second signal including second information in which a local identifier which is used in a wireless local area network (LAN) and different from a global identifier is specified, and configured to transmit a third signal including third information in which a local identifier allocated by the own communication device is specified.

(12)

The communication device according to (11), in which a value of the local identifier specified from the third information is different from a value of the local identifier specified from the second information included in the second signal.

(13)

The communication device according to (11) or (12), in which the local identifier is independently allocated for each of a single or a plurality of frequencies.

(14)

The communication device according to any one of (11) to (13), in which the local identifier is allocated in common to a plurality of frequencies.

(15)

The communication device according to any one of (11) to (14), in which the third signal includes an association response frame.

(16)

The communication device according to any one of (11) to (15), in which the third signal includes a frame transmitted at a predetermined time interval.

(17)

A communication method, including:

receiving, by a communication unit, a first signal addressed to another communication device including first information in which a local identifier which is used in a wireless local area network (LAN) and different from a global identifier is specified; and transmitting, by the communication unit, a second signal including second information in which the local identifier specified from the first information included in the received first signal is specified.

(18)

A communication method, including:

receiving, by a communication unit, a second signal including second information in which a local identifier which is used in a wireless local area network (LAN) and different from a global identifier is specified; and transmitting, by the communication unit, a third signal including third information in which a local identifier allocated by the own communication device is specified.

REFERENCE SIGNS LIST

100 AP
200 STA
110, 210 data processing unit
120, 220 control unit
130, 230 wireless communication unit

The invention claimed is:

1. A wireless communication device, comprising:
communication circuitry configured to
receive a first signal including a first information from an access point wireless communication device, wherein the first information includes a first COLOR information identifying a first network, and a first global identifier identifying the first network;
receive a second signal including a second information from a second network, wherein the second information includes a second COLOR information identifying a second network, and a second global identifier identifying the second network;
receive a third signal including a third information, wherein the third information includes a third COLOR information identifying a third network, and a third global identifier identifying the third network;

determine that the second signal is not from the first network, and determine that the first COLOR information has a first physical identifier used to identify the first network and the second COLOR information has a second physical identifier used to identify the second network, wherein the first physical identifier and the second physical identifier have a same physical identifier value;

transmit a fourth signal including a fourth information indicating the determination of the same physical identifier value being used, and the fourth signal including the second COLOR information, the third COLOR information, and respective channel information associated with the second COLOR information and the third COLOR information, wherein the fourth signal is sent to the access point wireless communication device; and receive from the access point wireless communication device, a fifth signal including a fourth COLOR information having a new physical identifier value for the first network, wherein the fourth COLOR information is different from the first COLOR information, and is different from the second COLOR information, and is different from the third COLOR information.

2. The wireless communication device according to claim 1, wherein the first COLOR information includes the first physical identifier which is a local identifier allocated to the access point wireless communication device.

3. The wireless communication device according to claim 1, wherein the fourth signal includes an association request frame.

4. A wireless communication device of an access point device, comprising:
communication circuitry configured to
send a first signal including a first information to a first wireless communication device, wherein the first information includes a first COLOR information identifying a first network, and a first global identifier identifying the first network;
after the first wireless communication device received a second signal including a second information from a second network, wherein the second information includes a second COLOR information identifying the second network and a second global identifier identifying the second network, and after the first wireless communication device received a third signal including a third information from a third network, wherein the third information includes a third COLOR information identifying the third network and a third global identifier identifying the third network, receive from the first wireless communication device, in response to the first wireless communication device having determined that the second signal is not from the first network, and that the first COLOR information has a first physical identifier used to identify the first network and the second COLOR information has a second physical identifier, wherein the first physical identifier and the second physical identifier have a same physical identifier value, a fourth signal including a fourth information indicating the determination of the same COLOR detection physical identifier value being used, and the fourth signal including the second COLOR information, the third COLOR information, and respective channel information associated with the second COLOR information and the third COLOR information; and the communication circuitry of the access point device has the communication circuitry further configured to:
transmit to the first wireless communication device, a fifth signal including a fourth COLOR information having a new physical identifier value for the first network, wherein the fourth COLOR information is different from the first COLOR information, and is different from the second COLOR information, and is different from the third COLOR information.

5. The wireless communication device according to claim 4, wherein a value of the third COLOR information specified from the third information is different from a value of the second COLOR information specified from the second information included in the second signal.

6. The wireless communication device according to claim 4, wherein each of the third COLOR information and the second COLOR information is independently allocated for each of a single or a plurality of frequencies.

7. The wireless communication device according to claim 4, wherein each of the third COLOR information and the second COLOR information is allocated in common to a plurality of frequencies.

8. The wireless communication device according to claim 4, wherein the fourth signal includes an association response frame.

9. The wireless communication device according to claim 4, wherein the fourth signal includes a frame transmitted at a predetermined time interval.

10. A wireless communication method, comprising:
receiving a first signal including a first information from an access point wireless communication device, wherein the first information includes a first COLOR information identifying a first network, and a first global identifier identifying the first network;
receiving a second signal including a second information from a second network, wherein the second information includes a second COLOR information identifying a second network, and a second global identifier identifying the second network;
receiving a third signal including a third information, wherein the third information includes a third COLOR information identifying a third network, and a third global identifier identifying the third network;
determining that the second signal is not from the first network, and determining that the first COLOR information has a first physical identifier used to identify the first network and the second COLOR information has a second physical identifier used to identify the second network, wherein the first physical identifier and the second physical identifier have a same physical identifier value;
transmitting a fourth signal including a fourth information indicating the determination of the same physical identifier value being used, and the fourth signal including the second COLOR information, the third COLOR information, and respective channel information associated with the second COLOR information and the third COLOR information, wherein the fourth signal is sent to the access point wireless communication device; and
receiving from the access point wireless communication device, a fifth signal including a fourth COLOR information having a new physical identifier value for the first network, wherein the fourth COLOR information is different from the first COLOR information, and is different from the second COLOR information, and is different from the third COLOR information.

11. A wireless communication method performed by an access point wireless communication device, comprising:

sending a first signal including a first information to a first wireless communication device, wherein the first information includes a first COLOR information identifying a first network, and a first global identifier identifying the first network;

after the first wireless communication device received a second signal including a second information from a second network, wherein the second information includes a second COLOR information identifying the second network and a second global identifier identifying the second network, and after the first wireless communication device received a third signal including a third information from a third network, wherein the third information includes a third COLOR information identifying the third network and a third global identifier identifying the third network, receiving from the first wireless communication device, in response to the first wireless communication device having determined that the second signal is not from the first network, and that the first COLOR information has a first physical identifier used to identify the first network and the second COLOR information has a second physical identifier used to identify the second network, wherein the first physical identifier and the second physical identifier have a same physical identifier value, a fourth signal including a fourth information indicating the determination of the same COLOR detection physical identifier value being used, and the fourth signal including the second COLOR information, the third COLOR information, and respective channel information associated with the second COLOR information and the third COLOR information; and transmitting to the first wireless communication device, a fifth signal including a fourth COLOR information having a new physical identifier value for the first network, wherein the fourth COLOR information is different from the first COLOR information, and is different from the second COLOR information, and is different from the third COLOR information.

* * * * *